US008733480B2

(12) United States Patent
Watanabe et al.

(10) Patent No.: US 8,733,480 B2
(45) Date of Patent: May 27, 2014

(54) POWER TRANSMISSION APPARATUS

(75) Inventors: Takao Watanabe, Aichi-gun (JP); Eiji Tsuchiya, Aichi-gun (JP); Hiroyuki Nishizawa, Tajimi (JP); Takeshi Kitahata, Numazu (JP)

(73) Assignees: Kabushiki Kaisha Toyota Chuo Kenkyusho, Aichi-gun (JP); Toyota Jidosha Kabushiki Kaisha, Toyota-shi (JP)

( * ) Notice: Subject to any disclaimer, the term of this patent is extended or adjusted under 35 U.S.C. 154(b) by 175 days.

(21) Appl. No.: 12/675,416

(22) PCT Filed: Aug. 25, 2008

(86) PCT No.: PCT/JP2008/065118
§ 371 (c)(1),
(2), (4) Date: Feb. 26, 2010

(87) PCT Pub. No.: WO2009/028464
PCT Pub. Date: Mar. 5, 2009

(65) Prior Publication Data
US 2010/0219706 A1 Sep. 2, 2010

(30) Foreign Application Priority Data

Aug. 27, 2007 (JP) ................. 2007-219290
May 13, 2008 (JP) ................. 2008-126505

(51) Int. Cl.
*B60K 6/36* (2007.10)
*B60K 17/04* (2006.01)
*H02K 51/00* (2006.01)
*B60K 6/50* (2007.10)
*H02K 47/04* (2006.01)

(52) U.S. Cl.
USPC ............ 180/65.22; 310/114; 180/65.275; 180/65.31; 903/904; 903/915

(58) Field of Classification Search
USPC ........ 310/114; 180/65.1, 65.21, 65.31, 65.22, 180/65.275, 383; 477/3; 901/902–903, 906, 901/917–918, 945
See application file for complete search history.

(56) References Cited

U.S. PATENT DOCUMENTS 3,789,281 A * 1/1974 Shibata .................. 318/696
4,701,691 A * 10/1987 Nickoladze .............. 322/32
(Continued)

FOREIGN PATENT DOCUMENTS

EP 1746714 * 1/2007 ............ H02P 5/46
JP 8 340663 12/1996
(Continued)

OTHER PUBLICATIONS

Notice of Grounds for Rejection issued Sep. 27, 2011, in Japanese Patent Application No. 2007-197190 with Partial English translation.

(Continued)

*Primary Examiner* — Burton Mullins
(74) *Attorney, Agent, or Firm* — Oblon, Spivak, McClelland, Maier & Neustadt, L.L.P.

(57) ABSTRACT

A rotational difference is generated between a first and a second rotor and a third rotor, which causes an induced current to flow in a first rotor winding. This causes a torque to act between the first rotor and the third rotor. The rotary magnetic field generated by the induced current flowing through a second rotor winding interacts with a second stator, which in turn generates an induced electromotive force in a second stator winding. The induced electromotive force is applied via a phase adjustment circuit to a first stator winding, which generates a rotary magnetic field and causes a torque to act between the first stator and the third rotor. The rotary magnetic field generated by the second rotor winding and the induced current flowing in the second stator winding causes a torque to act between the second stator and the second rotor.

7 Claims, 24 Drawing Sheets

(56) References Cited

U.S. PATENT DOCUMENTS

| | | | |
|---|---|---|---|
| 5,708,314 A * | 1/1998 | Law | 310/114 |
| 5,744,895 A | 4/1998 | Seguchi et al. | |
| 5,917,248 A | 6/1999 | Seguchi et al. | |
| 6,018,694 A * | 1/2000 | Egami et al. | 701/102 |
| 6,098,735 A * | 8/2000 | Sadarangani et al. | 180/65.24 |
| 6,380,655 B1 | 4/2002 | Ide et al. | |
| 6,401,849 B1 * | 6/2002 | Seguchi et al. | 180/65.6 |
| 6,483,218 B1 * | 11/2002 | Petrinko | 310/112 |
| 6,611,127 B2 * | 8/2003 | Arimitsu et al. | 318/801 |
| 7,164,219 B2 * | 1/2007 | Hoeijmakers | 310/266 |
| 7,395,143 B2 * | 7/2008 | Villata et al. | 701/54 |
| 7,584,813 B2 * | 9/2009 | Yoshida | 180/65.29 |
| 7,863,847 B2 * | 1/2011 | Morita et al. | 318/539 |
| 2006/0152085 A1 * | 7/2006 | Flett et al. | 307/75 |
| 2007/0090707 A1 | 4/2007 | Moriya et al. | |
| 2007/0138986 A1 * | 6/2007 | Kutsuna et al. | 318/254 |
| 2009/0250280 A1 * | 10/2009 | Abe et al. | 180/65.285 |
| 2010/0179023 A1 * | 7/2010 | Loudot et al. | 477/3 |

FOREIGN PATENT DOCUMENTS

| | | | | |
|---|---|---|---|---|
| JP | 9 23509 | | 1/1997 | |
| JP | 9 46815 | | 2/1997 | |
| JP | 9 56010 | | 2/1997 | |
| JP | 9 163695 | | 6/1997 | |
| JP | 10 14011 | | 1/1998 | |
| JP | 10 42404 | | 2/1998 | |
| JP | 10 155265 | | 6/1998 | |
| JP | 11-206063 | * | 7/1999 | H02K 5/20 |
| JP | 2000 50585 | | 2/2000 | |
| JP | 2000-197324 | | 7/2000 | |
| JP | 2000-233667 | * | 8/2000 | B60K 41/06 |
| JP | 2001-136606 A | * | 5/2001 | B60L 11/14 |
| JP | 2001 339976 | | 12/2001 | |
| JP | 2003-299281 | | 10/2003 | |
| JP | 2004 320864 | | 11/2004 | |
| JP | 2005 519571 | | 6/2005 | |
| JP | 2007 116837 | | 5/2007 | |
| WO | 00 31857 | | 6/2000 | |

OTHER PUBLICATIONS

Office Action issued Sep. 14, 2010, in Japanese Patent Application No. 2008-126505 with English language translation.

* cited by examiner

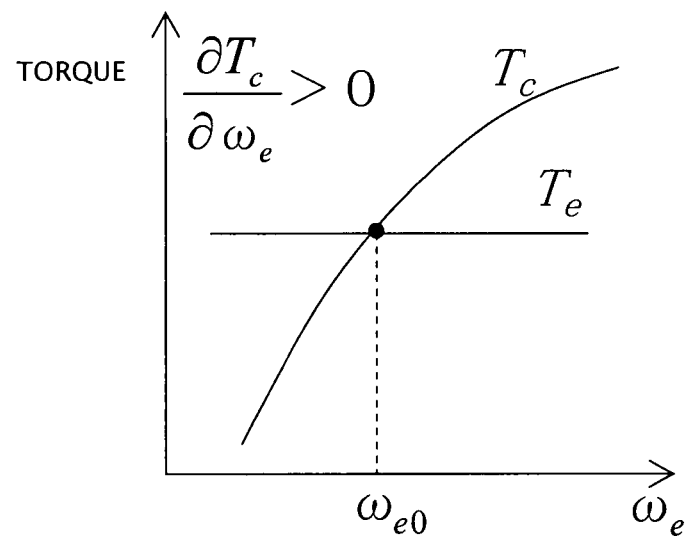
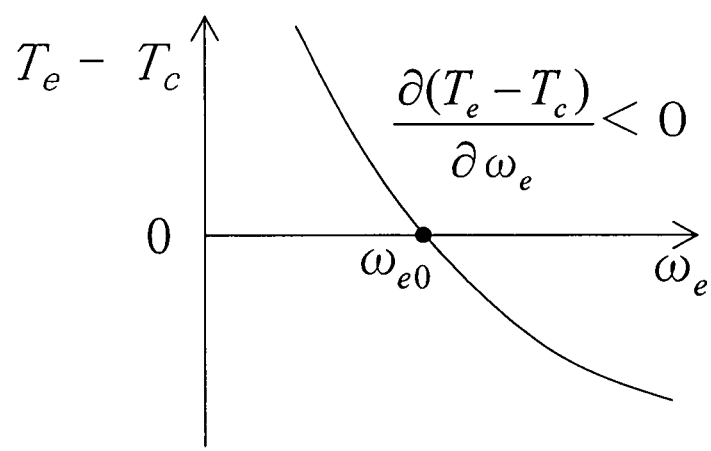
FIG. 23

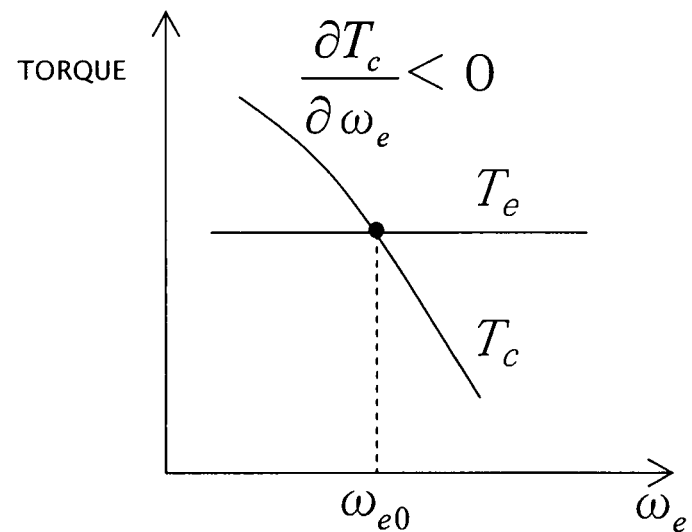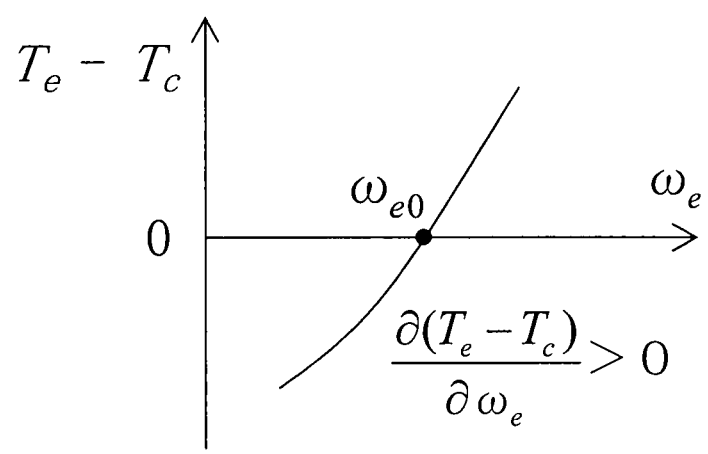
FIG. 24

POWER TRANSMISSION APPARATUS

TECHNICAL FIELD

The present invention relates to a power transmission apparatus, and more particularly relates to a power transmission apparatus that can drive a load by transmitting power of a prime mover to the load through an electromagnetic coupling between rotary elements, and can drive the load with electric power supplied to a stationary element conductor.

BACKGROUND ART

The following Patent Literature 1 discloses this kind of power transmission apparatus. The power transmission apparatus disclosed in Patent Literature 1 includes a first rotor having a magnet and mechanically connected to driving wheels, a second rotor having a winding electromagnetically coupled with the magnet of the first rotor and mechanically connected with an engine (prime mover), a stator having a winding electromagnetically coupled with the magnet of the first rotor, a transformation-rotor having a winding electrically connected to the winding of the second rotor and mechanically connected to the second rotor, and a transformation-stator having a winding electromagnetically coupled with the winding of the transformation-rotor. In Patent Literature 1, the power transmitted from the engine to the second rotor is transmitted to the first rotor through the electromagnetic coupling between the winding of the second rotor and the magnet of the first rotor. Therefore, the driving wheels can be driven by the power of the engine. Furthermore, electric power supplied from a battery via an inverter to the winding of the transformation-stator can be supplied to the winding of the transformation-rotor and the winding of the second rotor through the electromagnetic coupling between the winding of the transformation-stator and the winding of the transformation-rotor. Therefore, the rotational speed of the driving wheels can be controlled by controlling electric power to be supplied to the winding of the transformation-stator. Moreover, through the electromagnetic coupling between the winding of the stator and the magnet of the first rotor, the first rotor can generate power using the electric power supplied from the battery to the winding of the stator via the inverter and can drive the driving wheels. Therefore, the torque to be transmitted to the driving wheels can be controlled by controlling electric power to be supplied to the winding of the stator.

In Patent Literature 1, a winding axis of the winding of the transformation-rotor and a winding axis of the winding of the transformation-stator are parallel to the rotational axes of the rotors, and are perpendicular to a radial direction along which the transformation-rotor and the transformation-stator are opposed to each other. Therefore, the transformation-rotor and the transformation-stator can simply function as a transformer. No torque is generated between the transformation-rotor and the transformation-stator. Accordingly, the transformation-rotor and the transformation-stator cannot receive the torque generated by the engine. The torque generated by the engine is received as only the torque being generated between the first rotor and the second rotor. As a result, torque transmission capacity decreases.

In the Patent Literature 1, when the power of the engine is used to drive the driving wheels, if the rotational speed of the first rotor connected to the driving wheels exceeds the rotational speed of the second rotor connected to the engine, induced current flows through the winding of the second rotor according to a rotational speed difference between the first rotor and the second rotor, and a torque (braking torque) acts on the first rotor (driving wheels) in such a way as to reduce its rotational speed. In this case, if electric power is supplied to the winding of the second rotor by supplying electric power from the battery to the winding of the transformation-stator via the inverter, the braking torque can be prevented from acting on the first rotor. However, an inverter is required to be provided between the battery and the winding of the transformation-stator to perform a bidirectional electric power conversion, i.e., an electric power conversion for converting the DC power of the battery into AC power to be supplied to the winding of the transformation-stator (winding of the second rotor) and an electric power conversion for converting the AC power of the winding of the transformation-stator into DC power to be recovered by the battery. As a result, not only the inverter that performs the bidirectional electric power conversion between the battery and the stator winding but also the inverter that performs the bidirectional electric power conversion between the battery and the transformation-stator winding are separately required. If two inverters are provided, the configuration of the apparatus becomes complicated and the cost for the apparatus increases.

Patent Literature 1: JP 3067594 B
Patent Literature 2: JP 2007-116837 A
Patent Literature 3: J P 9-46815 A

DISCLOSURE OF THE INVENTION

The present invention has an advantage to improve the torque transmission capacity of a power transmission apparatus that can drive a load by transmitting the power of a prime mover to the load through an electromagnetic coupling between rotary elements, and can also drive the load with electric power supplied to a stationary element conductor. The present invention has another advantage, in the power transmission apparatus, to prevent a braking torque from acting on the load when the power of the prime mover is used to drive the load, without supplying electric power from an electric storage apparatus to a rotary element conductor.

A power transmission apparatus according to the present invention includes a first rotary element having a first rotary element conductor that can generate a rotary magnetic field, a second rotary element coupled with the first rotary element and having a second rotary element conductor that is connected to the first rotary element conductor and can generate a rotary magnetic field, a first stationary element having a first stationary element conductor that can generate a rotary magnetic field, a third rotary element that can rotate relative to the first and second rotary elements wherein a torque acts between the first rotary element and the third rotary element according to the rotary magnetic field generated by the first rotary element conductor, and a torque acts between the first stationary element and the third rotary element according to the rotary magnetic field generated by the first stationary element conductor, and a second stationary element having a second stationary element conductor through which induced current flows according to the rotary magnetic field generated by the second rotary element conductor, with an interaction between the induced current and the rotary magnetic field generated by the second rotary element conductor that can generate a torque acting between the second rotary element and the second stationary element, wherein power of a prime mover is transmitted to one of the first and second rotary elements and the third rotary element, and power of the other of the first and second rotary elements and the third rotary element is transmitted to a load, the first and second rotary element conductors can generate the rotary magnetic field when induced current flows according to a rotational difference generated between the first rotary element and the third rotary element, the first rotary element conductor and the second rotary element conductor are connected in such a manner that a rotational direction of the rotary magnetic field generated by the first rotary element conductor and a rotational direction of the rotary magnetic field generated by the second rotary element conductor are the same in a state where induced current flows through the first rotary element conductor and the second rotary element conductor, the number of poles of the second rotary element is equal to the number of poles of the first rotary element, electric power can be supplied from the second stationary element conductor to the first stationary element conductor, and a phase adjustment circuit is provided between the second stationary element conductor and the first stationary element conductor.

A power transmission apparatus according to the present invention includes a first rotary element having a first rotary element conductor that can generate a rotary magnetic field, a second rotary element coupled with the first rotary element and having a second rotary element conductor that is connected to the first rotary element conductor and can generate a rotary magnetic field, a first stationary element having a first stationary element conductor that can generate a rotary magnetic field, a third rotary element that can rotate relative to the first and second rotary elements wherein a torque acts between the first rotary element and the third rotary element according to the rotary magnetic field generated by the first rotary element conductor and a torque acts between the first stationary element and the third rotary element according to the rotary magnetic field generated by the first stationary element conductor, and a second stationary element having a second stationary element conductor through which induced current flows according to the rotary magnetic field generated by the second rotary element conductor, with an interaction between the induced current and the rotary magnetic field generated by the second rotary element conductor that can generate a torque acting between the second rotary element and the second stationary element, wherein power of a prime mover is transmitted to one of the first and second rotary elements and the third rotary element, and power of the other of the first and second rotary elements and the third rotary element is transmitted to a load, the first and second rotary element conductors can generate the rotary magnetic field when induced current flows according to a rotational difference generated between the first rotary element and the third rotary element, a rectifier is provided to rectify AC power generated by the second stationary element conductor, electric power rectified by the rectifier is converted into AC power by an inverter and can be supplied to the first stationary element conductor.

A power transmission apparatus according to the present invention includes a first rotary element having a first rotary element conductor that can generate a rotary magnetic field, a second rotary element coupled with the first rotary element and having a second rotary element conductor that is connected to the first rotary element conductor and can generate a rotary magnetic field, a first stationary element having a first stationary element conductor that can generate a rotary magnetic field, a third rotary element that can rotate relative to the first and second rotary elements wherein a torque acts between the first rotary element and the third rotary element according to the rotary magnetic field generated by the first rotary element conductor, and a torque acts between the first stationary element and the third rotary element according to the rotary magnetic field generated by the first stationary element conductor, and a second stationary element having a second stationary element conductor through which induced current flows according to the rotary magnetic field generated by the second rotary element conductor, with an interaction between the induced current and the rotary magnetic field generated by the second rotary element conductor that can generate a torque acting between the second rotary element and the second stationary element, wherein power of a prime mover is transmitted to one of the first and second rotary elements and the third rotary element, and power of the other of the first and second rotary elements and the third rotary element is transmitted to a load, the first and second rotary element conductors can generate the rotary magnetic field when induced current flows according to a rotational difference generated between the first rotary element and the third rotary element, electric power can be supplied from the second stationary element conductor to the first stationary element conductor, and DC power from a DC power source is converted into AC power by an inverter and can be supplied to the second stationary element conductor.

In an aspect of the present invention, it is preferable that the first rotary element conductor and the second rotary element conductor are connected in such a manner that a rotational direction of the rotary magnetic field generated by the first rotary element conductor and a rotational direction of the rotary magnetic field generated by the second rotary element conductor are the same in a state where induced current flows through the first rotary element conductor and the second rotary element conductor, and the number of poles of the second rotary element is equal to or greater than the number of poles of the first rotary element.

In an aspect of the present invention, it is preferable that the first rotary element conductor and the second rotary element conductor are connected in such a manner that a rotational direction of the rotary magnetic field generated by the first rotary element conductor and a rotational direction of the rotary magnetic field generated by the second rotary element conductor are opposite in a state where induced current flows through the first and second rotary element conductors.

In an aspect of the present invention, it is preferable that a first rotary element winding serving as the first rotary element conductor be disposed in the first rotary element and a second rotary element winding serving as the second rotary element conductor be disposed in the second rotary element. According to this aspect, it is preferable that a stationary element winding serving as the second stationary element conductor be disposed in the second stationary element and a winding axis of the second rotary element winding and a winding axis of the stationary element winding accord with a direction along which the second rotary element and the second stationary element are opposed to each other.

In an aspect of the present invention, it is preferable that a first cage conductor serving as a first rotary element conductor is disposed in the first rotary element and a second cage conductor serving as the second rotary element conductor is disposed in the second rotary element.

In an aspect of the present invention, it is preferable that a magnet that generates a field flux be disposed in the third rotary element so that a torque acts between the first rotary element and the third rotary element with an interaction between the field flux and the rotary magnetic field generated by the first rotary element conductor. In an aspect of the present invention, it is preferable that a magnet that generates a field flux be disposed in the third rotary element so that a torque acts between the first stationary element and the third rotary element with an interaction between the field flux and the rotary magnetic field generated by the first stationary element conductor.

In an aspect of the present invention, it is preferable to have an engaging apparatus capable of mechanically engaging the first and second rotary elements with the third rotary element.

A power transmission apparatus according to the present invention includes a first rotary element having a rotary element conductor that can generate a rotary magnetic field, a stationary element having a stationary element conductor that can generate a rotary magnetic field, and a second rotary element that can rotate relative to the first rotary element wherein a torque acts between the first rotary element and the second rotary element according to the rotary magnetic field generated by the rotary element conductor, and a torque acts between the stationary element and the second rotary element according to the rotary magnetic field generated by the stationary element conductor, wherein the rotary element conductor can generate the rotary magnetic field when induced current flows according to a rotational difference generated between the first rotary element and the second rotary element, power of a prime mover is transmitted to one of the first rotary element and the second rotary element, and power of the other of the first rotary element and the second rotary element is transmitted to a load, wherein the power transmission apparatus further includes a transmission configured to transmit the power from the other of the first rotary element and the second rotary element to the load while changing speed, an electric power transmission unit configured to take out AC power from the rotary element conductor, and an electric power conversion unit configured to convert the AC power taken out by the electric power transmission unit and supply converted electric power to the stationary element conductor.

In an aspect of the present invention, it is preferable that the electric power conversion unit includes a rectifier configured to rectify the AC power taken out by the electric power transmission unit, and a DC-DC converter configured to convert a voltage of the electric power rectified by the rectifier into a voltage to be output, wherein the electric power which voltage is converted by the DC-DC converter is converted by an inverter into an AC electric power to be supplied to the stationary element conductor.

In an aspect of the present invention, it is preferable that the electric power transmission unit includes an electric power transmitting rotary element coupled with the first rotary element, wherein the electric power transmitting rotary element is connected to the rotary element conductor of the first rotary element and having an electric power transmitting rotary element conductor that can generate a rotary magnetic field, and an electric power transmitting stationary element having an electric power transmitting stationary element conductor through which induced current flows according to the rotary magnetic field generated by the electric power transmitting rotary element conductor, wherein the electric power conversion unit is configured to convert AC power generated by the electric power transmitting stationary element conductor.

In an aspect of the present invention, it is preferable that the electric power transmission unit includes a brush connected to the electric power conversion unit, and a slip ring connected to the rotary element conductor of the first rotary element and rotating together with the first rotary element while causing slip relative to the brush.

In an aspect of the present invention, it is preferable that an engaging apparatus be provided to mechanically engage the first rotary element with the second rotary element.

In an aspect of the present invention, it is preferable that a gear ratio of the transmission be changed so that a rotational speed of one of the first rotary element and the second rotary element becomes higher than a rotational speed of the other.

In an aspect of the present invention, it is preferable that a voltage conversion ratio of the DC-DC converter be decreased if a rotational speed of one of the first rotary element and the second rotary element is higher than a rotational speed of the other.

The present invention can improve the torque transmission capacity because a torque acts between the first rotary element and the third rotary element, a torque acts between the first stationary element and the third rotary element, and a torque acts between the second stationary element and the second rotary element.

Moreover, according to the present invention, when the power of the prime mover is used to drive a load, the rotational speed of a prime mover side rotary element (one of the first rotary element and the second rotary element) can be maintained higher than the rotational speed of a load side rotary element (the other of the first rotary element and the second rotary element). Therefore, the present invention can prevent a braking torque from acting on the load side rotary element without supplying electric power to the rotary element conductor of the first rotary element from the electric storage apparatus via the electric power transmission unit. As a result, the present invention does not require any inverter to perform the bidirectional electric power conversion for the rotary element conductor of the first rotary element. Accordingly, the present invention can prevent the braking torque from acting on the load in the state where the power of the prime mover is used to drive the load without complicating the configuration of the power transmission apparatus and without increasing the cost of the apparatus.

BRIEF DESCRIPTION OF THE DRAWINGS

FIG. 23 illustrates a condition where the behavior of a rotational speed $\omega_e$ of an engine 36 is stabilized.

FIG. 24 illustrates a condition where the behavior of the rotational speed $\omega_e$ of the engine 36 becomes unstable.

BEST MODE FOR CARRYING OUT THE INVENTION

Preferred embodiments of the present invention are described below with reference to the drawings.

[First Embodiment]

Figure 1:
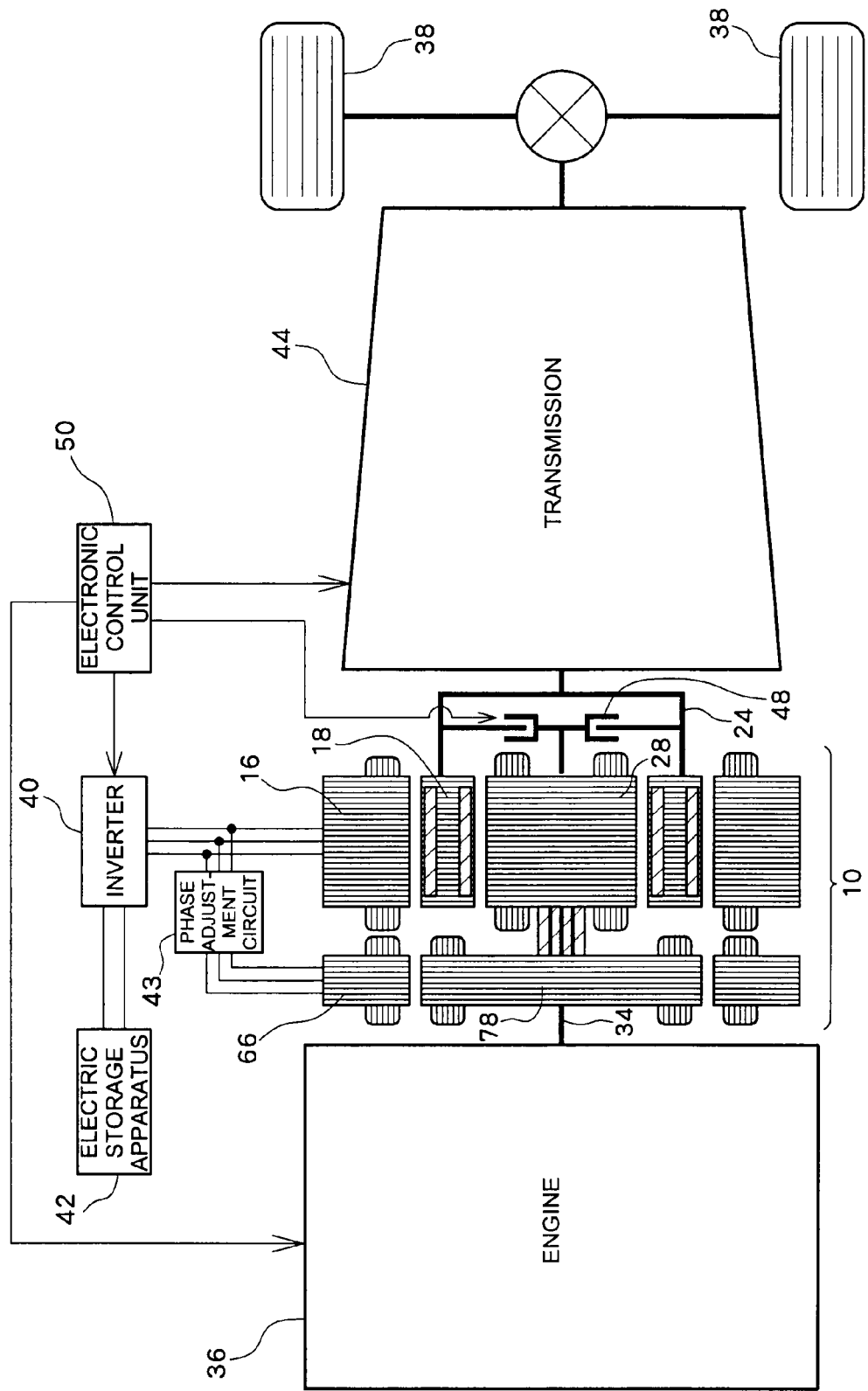
FIG. 1 illustrates a schematic configuration of a hybrid driving apparatus including a power transmission apparatus according to a first embodiment of the present invention.
Figure 2:
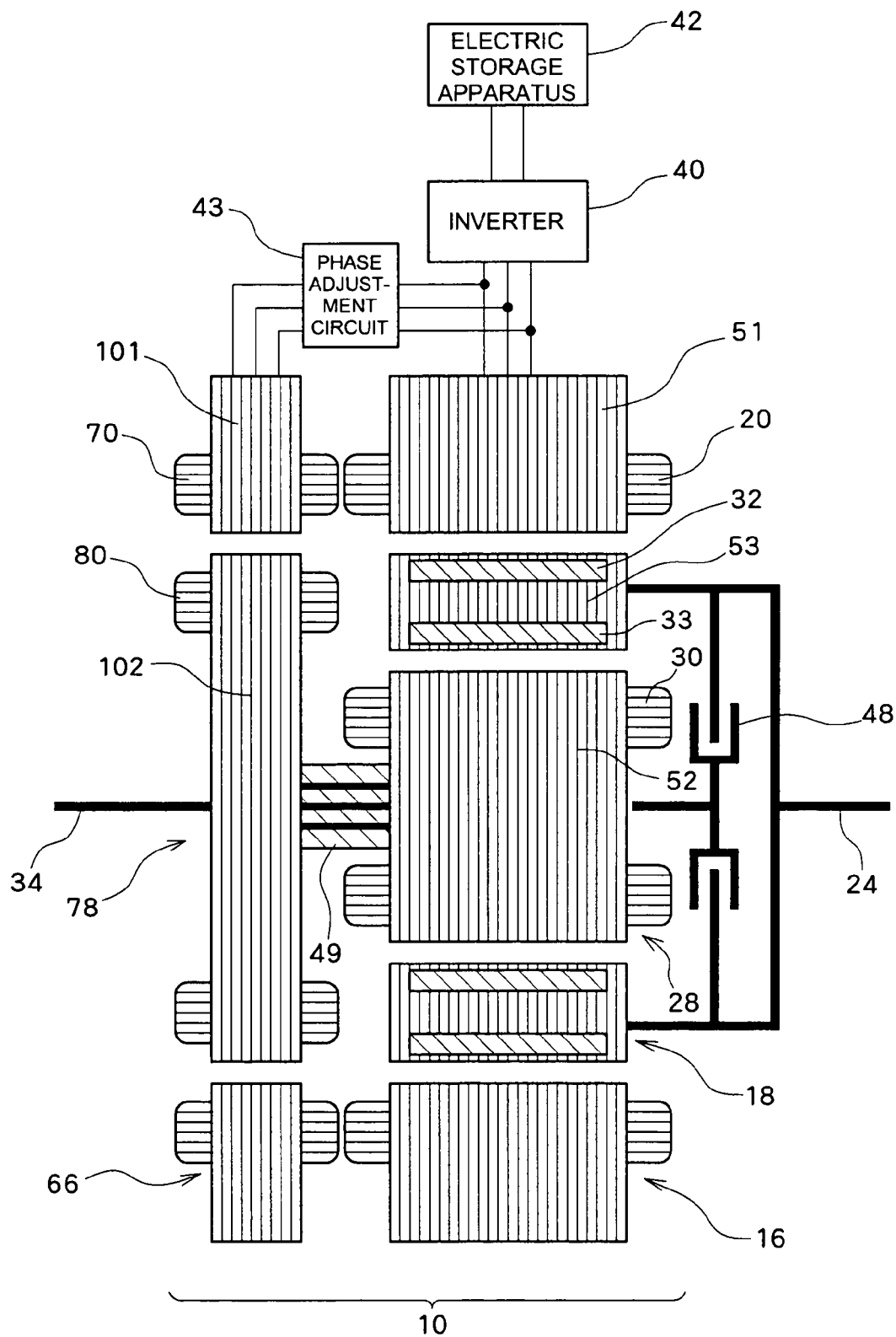
FIG. 2 illustrates a schematic configuration of the power transmission apparatus according to the first embodiment of the present invention.
Figure 3:
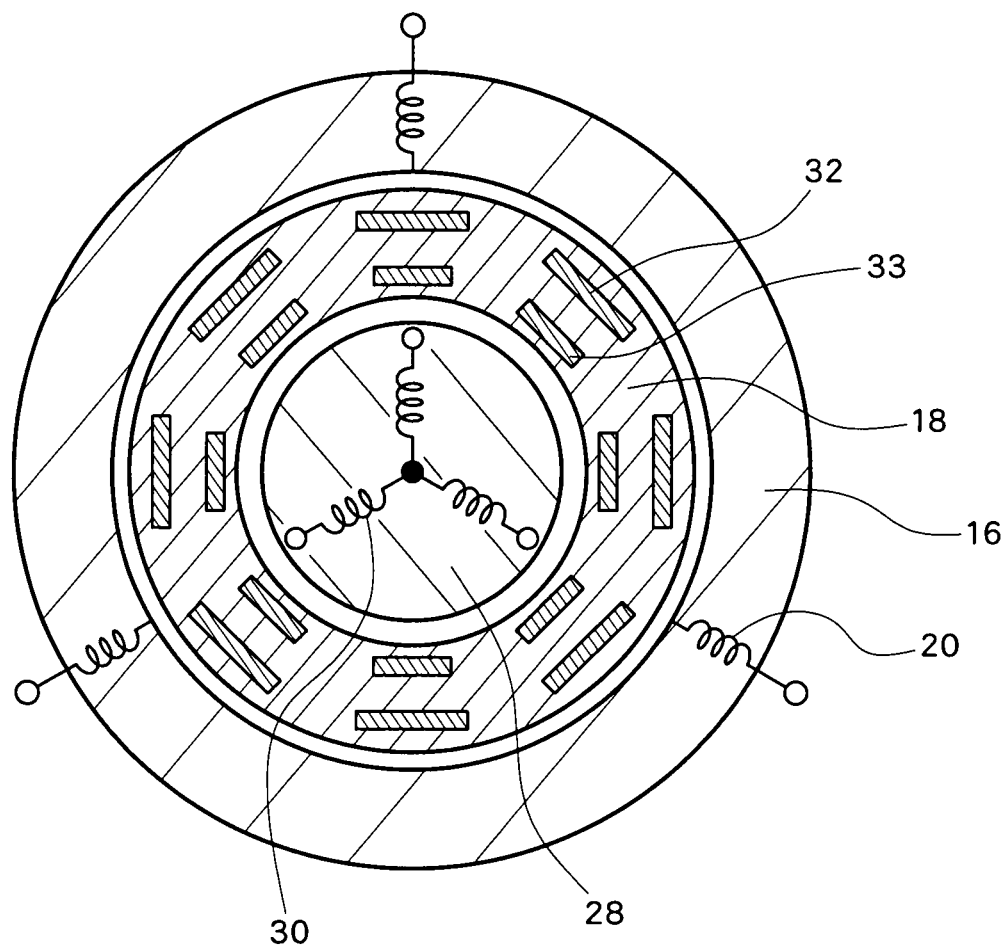
FIG. 3 illustrates a schematic configuration of the power transmission apparatus according to the first embodiment of the present invention.
Figure 4:
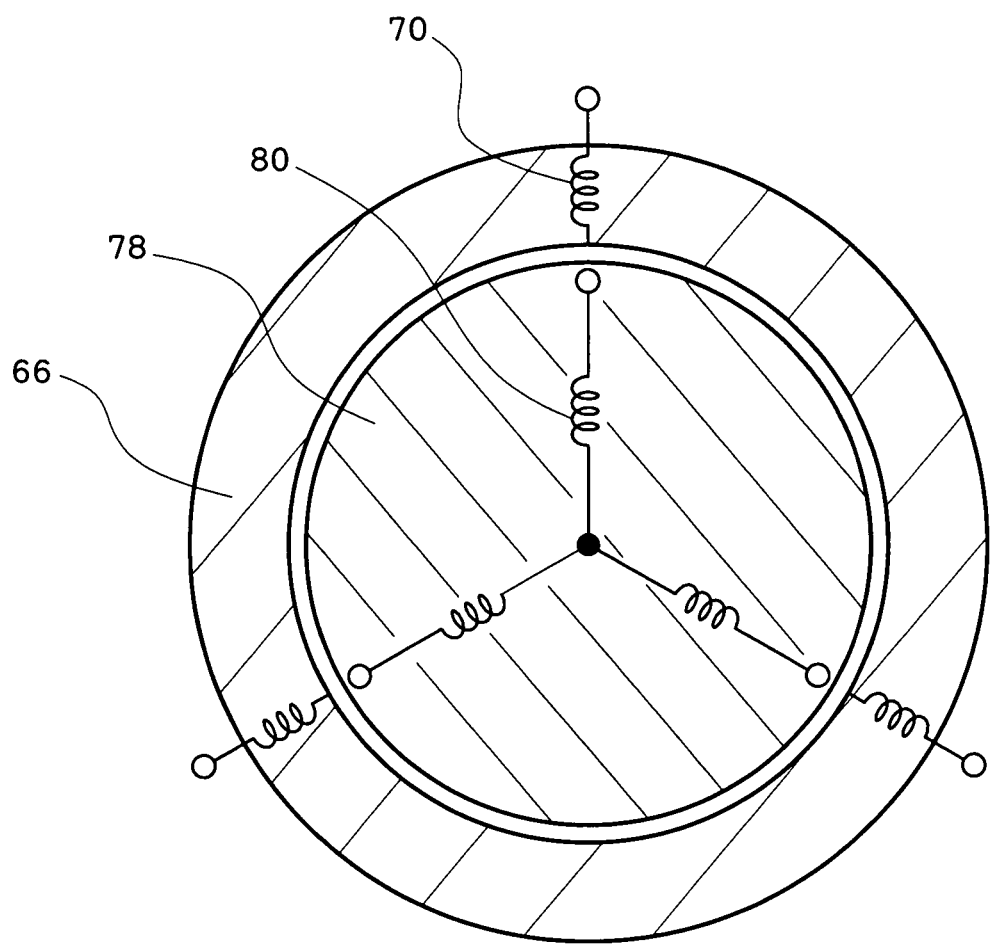
FIG. 4 illustrates a schematic configuration of the power transmission apparatus according to the first embodiment of the present invention.

FIGS. 1 to 4 illustrate a schematic configuration of a hybrid driving apparatus including a power transmission apparatus according to a first embodiment of the present invention. FIG. 1 illustrates an overall configuration of the hybrid driving apparatus. FIGS. 2 to 4 illustrate a configuration of an electric rotary machine 10. The hybrid driving apparatus according to the present embodiment includes an engine (an internal combustion engine) 36 as a prime mover that can generate power (mechanical power), a transmission 44 provided between the engine 36 and wheels 38, and an electric rotary machine 10 provided between the engine 36 and the transmission 44. The hybrid driving apparatus according to the present embodiment can be used, for example, as a power output apparatus that can drive an automotive vehicle.

The electric rotary machine 10 includes a first stator (a first stationary element) 16 fixed to a casing (not illustrated), a first rotor (a first rotary element) 28 disposed on a radial inner side of the first stator 16 and rotatable relative to the first stator 16, a second stator (a second stationary element) 66 fixed to a casing (not illustrated), a second rotor (a second rotary element) 78 disposed on a radial inner side of the second stator 66 and rotatable relative to the second stator 66, and a third rotor (a third rotary element) 18 disposed between the first stator 16 and the first rotor 28 and rotatable to the first stator 16 and the first rotor 28. The second rotor 78 is mechanically coupled with the first rotor 28 via a rotational shaft 49. The first rotor 28 and the second rotor 78 are mechanically connected to an input shaft 34 of the electric rotary machine 10. The input shaft 34 is mechanically connected to the engine 36. Therefore, power of the engine 36 can be transmitted to the first rotor 28 and the second rotor 78. On the other hand, the third rotor 18 is mechanically connected to an output shaft 24 of the electric rotary machine 10. The output shaft 24 is mechanically connected to the wheels 38 via the transmission 44. Therefore, the power of the third rotor 18 can be transmitted to the wheels 38.

The first stator 16 includes a stator core (a first stationary element core) 51 and a first stator winding (a first stationary element conductor) 20 having multiple phases (e.g., three phases) disposed along a circumferential direction of the stator core 51. When a multiple-phase (e.g., three-phase) AC current flows through the multiple-phase first stator winding 20, the first stator winding 20 can generate a rotary magnetic field that rotates in the circumferential direction of the first stator. Similarly, the second stator 66 includes a stator core (a second stationary element core) 101 and a second stator winding (a second stationary element conductor) 70 having multiple phases (e.g., three phases) disposed along a circumferential direction of the stator core 101. When a multiple-phase (e.g., three-phase) AC current flows through the multiple-phase second stator winding 70, the second stator winding 70 can generate a rotary magnetic field that rotates in the circumferential direction of the second stator.

The first rotor 28 includes a rotor core (a first rotary element core) 52 and a first rotor winding (a first rotary element conductor) 30 having multiple phases (e.g., three phases) disposed along a circumferential direction of the rotor core 52. When a multiple-phase (e.g., three-phase) AC current flows through the multiple-phase first rotor winding 30, the first rotor winding 30 can generate a rotary magnetic field that rotates in the circumferential direction of the first rotor. Similarly, the second rotor 78 includes a rotor core (a second rotary element core) 102 and a second rotor winding (a second rotary element conductor) 80 having multiple phases (e.g., three phases) disposed along a circumferential direction of the rotor core 102. When a multiple-phase (e.g., three-phase) AC current flows through the multiple-phase second rotor winding 80, the second rotor winding 80 can generate a rotary magnetic field that rotates in the circumferential direction of the second rotor.

Figure 5:
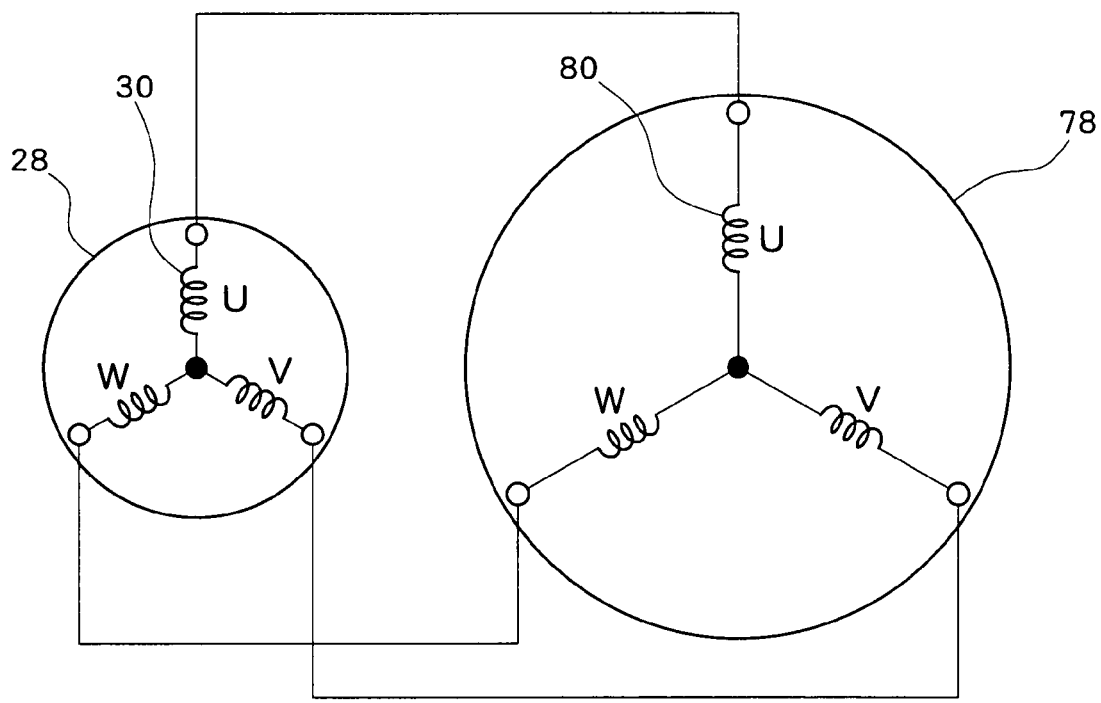
FIG. 5 illustrates an example of a connection between a first rotor winding 30 and a second rotor winding 80.

The second rotor winding 80 is electrically connected (directly connected) to the first rotor winding 30. In the present embodiment, the first rotor winding 30 and the second rotor winding 80 are connected to have the same phase in such a manner that a rotational direction of the rotary magnetic field generated by the first rotor winding 30 and a rotational direction of the rotary magnetic field generated by the second rotor winding 80 are the same in a state where AC current flows through the first rotor winding 30 and the second rotor winding 80. For example, both the first rotor winding 30 and the second rotor winding 80 can be constituted by a 3-phase winding having U-phase, V-phase, and W-phase. In this case, as illustrated in FIG. 5, a U-phase of the first rotor winding 30 is connected to a U-phase of the second rotor winding 80, a V-phase of the first rotor winding 30 is connected to a V-phase of the second rotor winding 80, and a W-phase of the first rotor winding 30 is connected to a W-phase of the second rotor winding 80. Namely, when the same phase windings are connected to each other for all phases, the rotational direction of the magnetic field generated by the first rotor winding 30 becomes identical to the rotational direction of the magnetic field generated by the second rotor winding 80.

The third rotor 18 includes a rotor core (a third rotary element core) 53 and permanent magnets 32 and 33 that are disposed along a circumferential direction of the rotor core 53 and can generate field fluxes. The permanent magnets 32 are disposed on an outer circumferential portion of the rotor core 53 in a confronting relationship with the first stator 16 (the stator core 51). The permanent magnets 33 are disposed on an inner circumferential portion of the rotor core 53 in a confronting relationship with the first rotor 28 (the rotor core 52). In the present embodiment, the permanent magnets 32 and 33 may be integrated.

Figure 6:
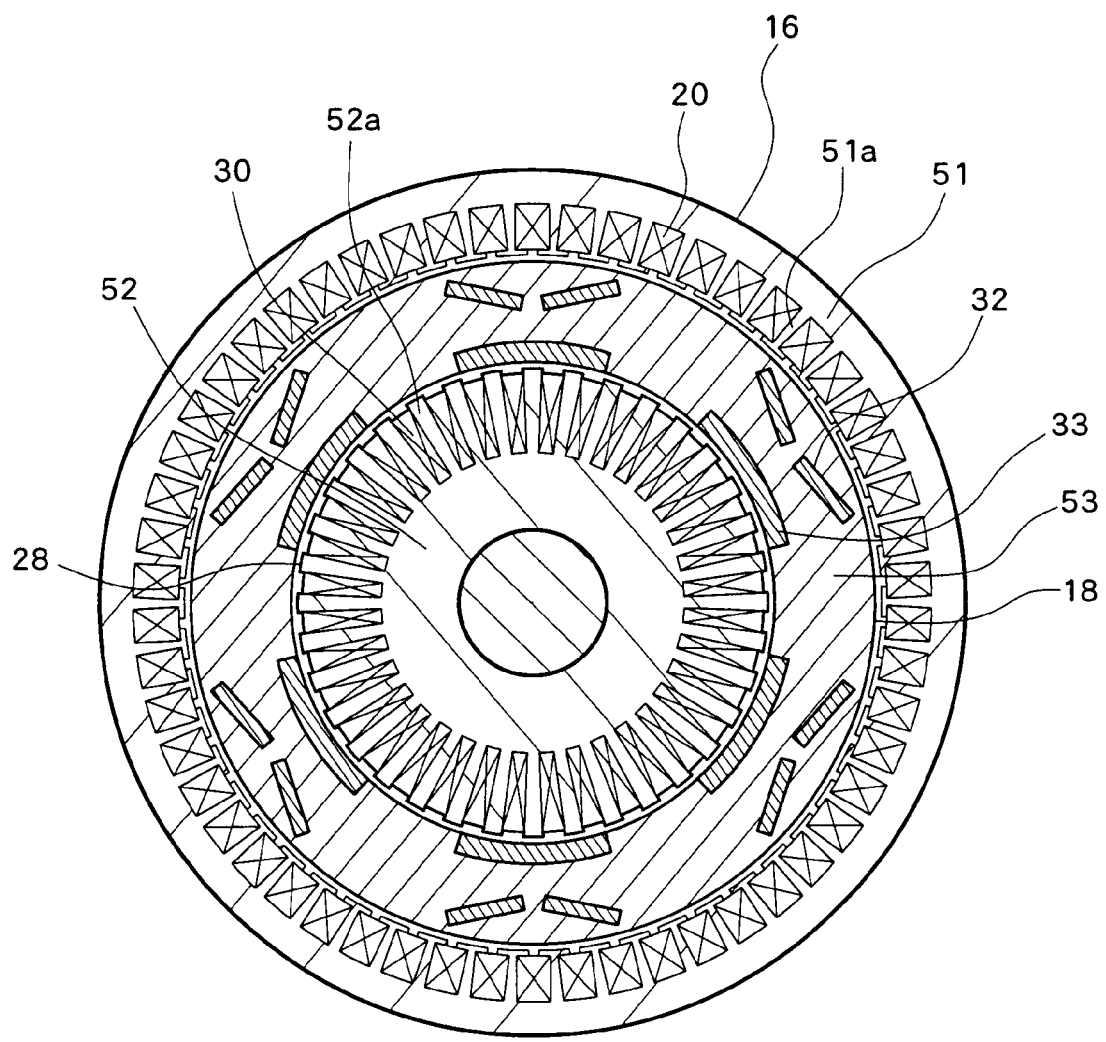
FIG. 6 illustrates an example configuration of a first rotor 28, a third rotor 18, and a first stator 16.
Figure 7:
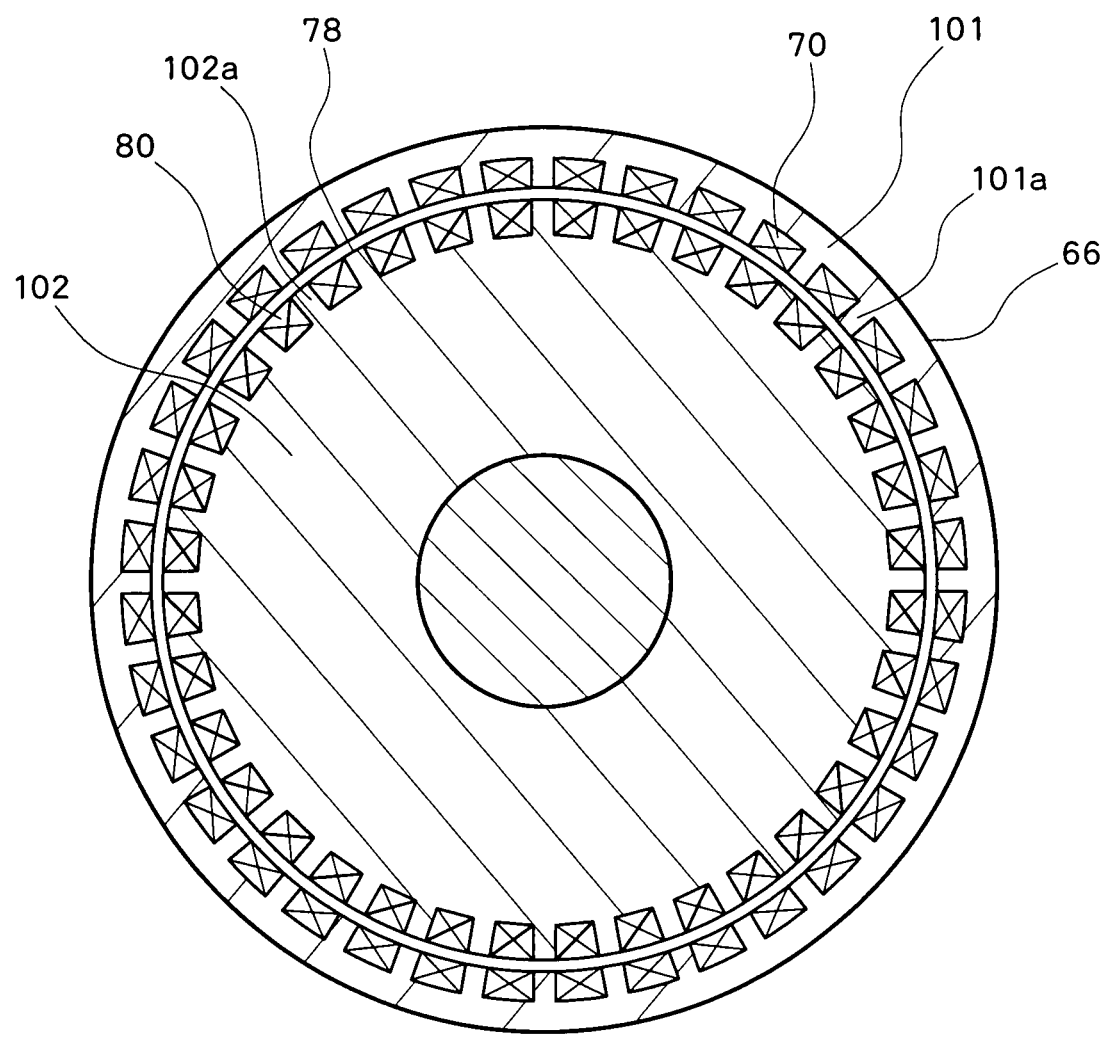
FIG. 7 illustrates an example configuration of a second rotor 78 and a second stator 66.

FIG. 6 illustrates a detailed example configuration of the first rotor 28, the third rotor 18, and the first stator 16. FIG. 7 illustrates a detailed example configuration of the second rotor 78 and the second stator 66. According to the example illustrated in FIG. 6, the first rotor 28, the third rotor 18, and the first stator 16 are coaxially disposed. The stator core 51 of the first stator 16 has a plurality of teeth 51*a* that protrude toward the radial inner side (the third rotor 18 side) and are disposed at predetermined intervals along the circumferential direction of the first stator. Each first stator winding 20 is wound around the teeth 51*a* to constitute magnetic poles. The rotor core 52 of the first rotor 28 has a plurality of teeth 52*a* that protrude toward the radial outer side (the third rotor 18 side) and are disposed at predetermined intervals along the circumferential direction of the first rotor. Each first rotor winding 30 is wound around the teeth 52*a* to constitute magnetic poles. The teeth 51*a* of the first stator 16 and the permanent magnets 32 of the third rotor 18 are disposed in a confronting relationship in the radial direction, which is perpendicular to a rotational axis of the third rotor 18 (which accords with a rotational axis of the first rotor 28). The teeth 52*a* of the first rotor 28 and the permanent magnets 33 of the third rotor 18 are disposed in a confronting relationship in the radial direction. The winding axis of the first stator winding 20 and the winding axis of the first rotor winding 30 accord with the above-described radial direction (a direction along which the first rotor 28 and the third rotor 18 confront each other). The permanent magnets 32 and 33 are disposed at predetermined intervals in the circumferential direction of the third rotor. The permanent magnets 32 are embedded in the rotor core 53 so as to form a V shape. Alternatively, the permanent magnets 32 and 33 can be disposed on an exposed surface (an outer circumferential surface or an inner circumferential surface) of the third rotor 18 or can be embedded in the third rotor 18 (in the rotor core 53).

According to the example illustrated in FIG. 7, the second rotor 78 and the second stator 66 are coaxially disposed. The stator core 101 of the second stator 66 has a plurality of teeth 101*a* that protrude toward the radial inner side (the second rotor 78 side) and are disposed at predetermined intervals along the circumferential direction of the second stator. Each second stator winding 70 is wound around the teeth 101*a* to constitute magnetic poles. The rotor core 102 of the second rotor 78 has a plurality of teeth 102*a* that protrude toward the radial outer side (the second stator 66 side) and are disposed at predetermined intervals along the circumferential direction of the second rotor. Each second rotor winding 80 is wound around the teeth 102*a* to constitute magnetic poles. The number of poles of the second rotor 78 is equal to the number of poles of the first rotor 28. The teeth 101*a* of the second stator 66 and the teeth 102*a* of the second rotor 78 are disposed in a confronting relationship in the radial direction, which is perpendicular to the rotational axis of the second rotor 78. The winding axis of the second stator winding 70 and the winding axis of the second rotor winding 80 accord with the above-described radial direction (a direction along which the second stator 66 and the second rotor 78 confront with each other).

A chargeable/dischargeable electric storage apparatus 42, which is provided as a DC power source and can be constituted, for example, by a secondary battery, can store electric energy. An inverter 40 includes a switching element (not illustrated), which performs a switching operation for converting DC power of the electric storage apparatus 42 into AC (e.g., three-phase AC) electric power. The inverter 40 can supply the converted power to each phase of the first stator winding 20 and the second stator winding 70. A phase adjustment circuit 43 is provided between the second stator winding 70 and the first stator winding 20. More specifically, the phase adjustment circuit 43 is provided on the electric power line that electrically connects the second stator winding 70, the first stator winding 20, and the inverter 40.

When a multiple-phase (e.g., three-phase) AC current flows through the multiple-phase first stator winding 20, the first stator winding 20 can generate a rotary magnetic field that rotates in the circumferential direction of the first stator. An electromagnetic interaction (attraction and repulsion functions) between the rotary magnetic field generated by the first stator winding 20 and the field fluxes generated by the permanent magnets 32 generates a torque (a magnet torque) which acts on the third rotor 18 so as to rotate/drive the third rotor 18. In other words, the electric power supplied from the electric storage apparatus 42 to the first stator winding 20 can be converted into the power (mechanical power) of the third rotor 18. Furthermore, the inverter 40 can convert the AC current flowing through each phase of the first stator winding 20 into DC current in such a way as to store recovered electric energy in the electric storage apparatus 42. In this case, the power of the third rotor 18 can be converted into electric power of the first stator winding 20 and recovered in the electric storage apparatus 42. As described above, when the rotary magnetic field generated by the first stator winding 20 interacts with the third rotor 18 through an electromagnetic coupling between the first stator winding 20 of the first stator 16 and the permanent magnets 32 of the third rotor 18, a torque (a magnet torque) can be generated so as to act between the first stator 16 and the third rotor 18. Moreover, for example, as illustrated in FIG. 6, in a case where a magnetic material (a ferromagnetic material) is disposed in a confronting relationship with the first stator 16 (the teeth 51*a*) as a salient pole portion located between the permanent magnets 32, or in a case where the permanent magnets 32 are embedded in the third rotor 18 (in the rotor core 53), not only the magnet torque but also a reluctance torque acts between the first stator 16 and the third rotor 18 according to an interaction between the rotary magnetic field generated by the first stator 16 and the third rotor 18. The inverter 40 can perform a bidirectional electric power conversion. The electric storage apparatus 42 can supply or receive electric power to or from the first stator winding 20.

If the first and second rotors 28 and 78 rotate relative to the third rotor 18, an induced electromotive force appears across the first rotor winding 30 according to a rotational difference generated between the first rotor 28 (the first rotor winding 30) and the third rotor 18 (the permanent magnets 33). Thus, induced current flows through the first rotor winding 30 and a rotary magnetic field is generated. Further, an electromagnetic interaction between the rotary magnetic field generated by the induced current flowing through the first rotor winding 30 and the field fluxes of the permanent magnets 33 can generate a torque that acts on the third rotor 18 and can rotate/drive the third rotor 18. As described above, when the first rotor winding 30 of the first rotor 28 is electromagnetically coupled with the permanent magnets 33 of the third rotor 18, the torque (the magnet torque) according to an interaction between the rotary magnetic field generated by the first rotor winding 30 and the third rotor 18 acts between the first rotor 28 and the third rotor 18. Therefore, the power (the mechanical power) can be transmitted between the first rotor 28 and the third rotor 18. An electromagnetic coupling function can thus be realized. Furthermore, in a case where a magnetic material (a ferromagnetic material) is disposed in a confronting relationship with the first rotor 28 (teeth 52a) as a salient pole portion located between the permanent magnets 33, or in a case where the permanent magnets 33 are embedded in the third rotor 18 (in the rotor core 53), not only the magnet torque but also a reluctance torque acts between the first rotor 28 and the third rotor 18 according to an interaction between the rotary magnetic field generated by the first rotor 28 and the third rotor 18.

Further, as the first rotor winding 30 is electrically connected to the second rotor winding 80, the induced current generated in the first rotor winding 30 according to the rotational difference between the first rotor 28 and the third rotor 18 flows through the second rotor winding 80. Thus, the second rotor 78 forms a rotary magnetic field with the induced current flowing through the second rotor winding 80. An induced electromotive force appears across the second stator winding 70 according to an interaction between the rotary magnetic field generated by the second rotor winding 80 and the second stator 66, and an induced current flows through the second stator winding 70. The phase adjustment circuit 43 adjusts the phase of the induced electromotive force (AC voltage) generated by the second stator winding 70 and supplies the adjusted AC voltage to the first stator winding 20. The first stator 16 can generate a rotary magnetic field with the AC power supplied from the second stator winding 70 to the first stator winding 20 to rotate/drive the third rotor 18. Moreover, an electromagnetic interaction between the rotary magnetic field generated by the second rotor winding 80 and the induced current flowing through the second stator winding 70 causes a torque to act between the second stator 66 and the second rotor 78. In this manner, the electromagnetic coupling between the second rotor winding 80 of the second rotor 78 and the second stator winding 70 of the second stator 66 can realize a non-contact power supply function for transmitting the AC electromotive force generated by the second rotor winding 80, without any contact, to the second stator winding 70. Moreover, the second rotor 78 and the second stator 66 can function as an induction machine.

A clutch 48 can selectively perform an engaging operation and a releasing operation to mechanically engage or disengage the input shaft 34 (the first and second rotors 28 and 78) with or from the output shaft 24 (the third rotor 18). If the clutch 48 performs the engaging operation to mechanically engage the first and second rotors 28 and 78 with the third rotor 18, the first and second rotors 28 and 78 are integrated with the third rotor 18 and rotate at the same rotational speed with the third rotor 18. On the other hand, if the clutch 48 performs the releasing operation to mechanical disengage the first and second rotors 28 and 78 from the third rotor 18, a rotational speed difference is allowed between the first/second rotors 28, 78 and the third rotor 18. The clutch 48 can use a hydraulic pressure or an electromagnetic force to switch its engaged/released state. A tightening force of the clutch 48 can be adjusted by controlling the hydraulic pressure or the electromagnetic force applied to the clutch 48.

An electronic control unit 50 controls a switching operation of the switching element of the inverter 40, so as to control the AC current flowing through each phase of the first stator winding 20. The electronic control unit 50 further controls a driving state of the engine 36, and also controls the gear ratio of the transmission 44. The electronic control unit 50 further switches the engaged/released state of the clutch 48 to perform control for mechanical engaging or disengaging the first and second rotors 28 and 78 with or from the third rotor 18.

An operation of the hybrid driving apparatus according to the present embodiment is described below.

The power of the engine 36, when generated, can be transmitted to the first and second rotors 28 and 78 to rotate/drive the first and second rotors 28 and 78. If the rotational speed of the first and second rotors 28 and 78 exceeds the rotational speed of the third rotor 18, induced current flowing through the first rotor winding 30 is generated. The electromagnetic interaction between the induced current and the field fluxes of the permanent magnets 33 causes a torque to act on the third rotor 18 in such a way as to rotate/drive the third rotor 18. As described above, the power transmitted from the engine 36 to the first and second rotors 28 and 78 can be transmitted to the third rotor 18 through the electromagnetic coupling between the first rotor winding 30 of the first rotor 28 and the permanent magnets 33 of the third rotor 18. The power transmitted to the third rotor 18 can be further transmitted via the transmission 44 while changing speed to the wheels 38 to drive an automotive vehicle (a load). Accordingly, the power of the engine 36 can be used to rotate/drive the wheels 38. As a rotational difference between the first/second rotors 28, 78 and the third rotor 18 can be allowed, the engine 36 does not stall even when the wheels 38 stop rotating.

Furthermore, the induced current generated by the first rotor winding 30 also flows through the second rotor winding 80. Therefore, the second rotor 78 forms a rotary magnetic field and induced current flows through the second stator winding 70. Therefore, a torque acts between the second stator 66 and the second rotor 78. The induced current generated by the second stator winding 70 also flows through the first stator winding 20. Therefore, the first stator 16 forms a rotary magnetic field. The electromagnetic interaction between the rotary magnetic field and the field fluxes of the permanent magnets 32 causes a torque to act on the third rotor 18. As a result, the torque of the third rotor 18 can be amplified.

It is now assumed that P1 represents the number of poles of the first rotor 28, P2 represents the number of poles of the second rotor 78, Ne [rpm] represents the rotational speed of the input shaft 34 (the first and second rotors 28 and 78), and Nout [rpm] represents the rotational speed of the output shaft 24 (the third rotor 18). The following formula (1) defines slip "s" between the first/second rotors 28, 78 and the third rotor 18. The power transmission between the first/second rotors 28, 78 and the third rotor 18 can be performed when s=1 (stall state) and s>0.

$$s=(Ne-Nout)/Ne \qquad (1)$$

The following formula (2) defines the rotational speed Nout of the output shaft 24 (the third rotor 18), which can be derived from the formula (1).

$$Nout=(1-s)\times Ne \qquad (2)$$

As s×Ne represents a relative rotational speed between the first/second rotors 28, 78 and the third rotor 18, the first rotor winding 30 generates an AC electromotive force of frequency f1 [Hz] expressed by the following formula (3).

$$f1 = P1 \times s \times Ne/120 \qquad (3)$$

As Ne represents the rotational speed of the first and second rotors 28 and 78, in a state where the first rotor winding 30 and the second rotor winding 80 are connected as illustrated in FIG. 5 (when the rotational directions of the magnetic fields are the same), the second stator 66 (the second stator winding 70) can recover AC power having frequency f2 [Hz] expressed by the following formula (4).

$$f2 = P2/120 \times (1 - P1/P2 \times s) \times Ne \qquad (4)$$

In a case where the number of poles P1 of the first rotor 28 is equal to the number of poles P2 of the second rotor 78 (P1=P2), the frequency f2 of the AC power recovered by the second stator 66 can be expressed by the following formula (5) that accords with a synchronous driving frequency of the rotational speed Nout of the third rotor 18.

$$f2 = P1/120 \times (1-s) \times Ne \qquad (5)$$

Accordingly, in the present embodiment, if the condition P1=P2 is satisfied, the AC power recovered by the second stator winding 20 can be supplied to the first stator winding 20 without converting the frequency, and the third rotor 18 can be driven synchronously. Also, the torque of the third rotor 18 can be amplified. In this case, the phase adjustment circuit 43 adjusts the phase of the AC power supplied from the second stator winding 70 to the first stator winding 20. Therefore, the torque acting between the first stator 16 and the third rotor 18 can be adjusted.

As will be understood from the formula (4), in a case where the number of poles P2 of the second rotor 78 is equal to or greater than the number of poles P1 of the first rotor 28 (P2≥P1), the direction of the torque acting between the second stator 66 and the second rotor 78 and the direction of the torque acting between the first rotor 28 and the third rotor 18 are the same. In short, the torque of the input shaft 34 is equal to a sum of the torque acting on the second rotor 78 and the torque acting on the first rotor 28.

The wheels 38 can be rotated/driven by the power of the engine 36 when the switching operation of the inverter 40 is controlled so as to supply electric power from the electric storage apparatus 42 to the first stator winding 20. Furthermore, the rotation/driving of the wheels 38 can be assisted by the power of the third rotor 18, which can be generated with the electric power supplied to the first stator winding 20. In this case, the power to be transmitted to the wheels 38 becomes greater than the power of the engine 36. On the other hand, if the switching operation of the inverter 40 is controlled so as to recover electric power from the second stator winding 70 to the electric storage apparatus 42, not only can the power of the engine 36 be used to rotate/drive the wheels 38 but also part of the power of the engine 36 can be converted into electric power of the second stator winding 70 and recovered in the electric storage apparatus 42. In this case, the power to be transmitted to the wheels 38 becomes smaller than the power of the engine 36.

In an EV (Electric Vehicle) traveling mode where the load is driven (the wheels 38 are rotated/driven) with the power of the electric rotary machine 10 without using the power of the engine 36, the electronic control unit 50 controls the switching operation of the inverter 40 to perform control for driving the load. For example, the electronic control unit 50 controls the switching operation of the inverter 40 so as to supply electric power from the electric storage apparatus 42 to the first stator winding 20. The electric power supplied to the first stator winding 20 can be converted into the power of the third rotor 18 through the electromagnetic coupling between the first stator winding 20 and the permanent magnets 32, and can be used to rotate/drive the wheels 38. In this manner, in a state where no power is generated by the engine 36, the wheels 38 can be rotated/driven with the electric power supplied to the first stator winding 20. The electronic control unit 50 further controls the switching operation of the inverter 40 in such a way as to recover electric power from the first stator winding 20 to the electric storage apparatus 42 in a decelerating operation of the load. Thus, the power of the load can be converted into electric power of the first stator winding 20 through the electromagnetic coupling between the first stator winding 20 and the permanent magnets 32, and can be recovered in the electric storage apparatus 42.

If the vehicle traveling speed (the rotational speed of the wheels 38) becomes equal to or greater than a predetermined speed and a condition Nout>Ne is satisfied, the clutch 48 mechanically engages the first/second rotors 28, 78 with the third rotor 18 so as to reduce Joule loss that may be caused by the induced current flowing through the first and second rotor windings 30 and 80 in accordance with the slip between the first/second rotors 28, 78 and the third rotor 18. In the engaging operation of the clutch 48, the torque to be transmitted between the first/second rotors 28, 78 and the third rotor 18 can be limited by adjusting the tightening force of the clutch 48. Accordingly, transmission of an impact torque between the first/second rotors 28, 78 and the third rotor 18 can be suppressed.

The electronic control unit 50 further controls the switching operation of the inverter 40 so as to supply electric power from the electric storage apparatus 42 to the second stator winding 70. Therefore, the second stator 66 can form a rotary magnetic field. An interaction between the rotary magnetic field of the second stator 66 and the second rotor 78 generates an induced current flowing through the second rotor winding 80. The electromagnetic interaction between the rotary magnetic field of the second stator 66 and the induced current of the second rotor winding 80 causes a torque to act between the second stator 66 and the second rotor 78. Thus, the second rotor 78 rotates/drives to enable the engine 36 to perform cranking. In this manner, the electric power supplied to the second stator winding 70 can be used to enable the engine 36 to perform a startup operation. The startup operation of the engine 36 can be performed when the third rotor 18 is rotating (when the automotive vehicle is travelling) and also when the third rotor 18 is stopped (when the automotive vehicle is stopped).

In the above-described present embodiment, induced current flows through the first and second rotor windings 30 and 80 according to a rotational difference between the first/second rotors 28, 78 and the third rotor 18 and a rotary magnetic field is generated. An interaction between the rotary magnetic field generated by the first rotor winding 30 and the third rotor 18 causes a torque to act between the first rotor 28 and the third rotor 18. Thus, the power of the engine 36 connected to the first and second rotors 28 and 78 can be transmitted to the wheels 38 connected to the third rotor 18. Furthermore, the second stator winding 70 generates an induced electromotive force according to an interaction between the rotary magnetic field generated by the second rotor winding 80 and the second stator 66. When the induced electromotive force is supplied to the first stator winding 20, a rotary magnetic field is generated. An interaction between the rotary magnetic field of the first stator winding 20 and the third rotor 18 causes a torque to act between the first stator 16 and the third rotor 18. Thus, the induced current flowing through the first and second rotor windings 30 and 80 can be used to amplify the torque of the third rotor 18. Furthermore, the second stator 66 and the second rotor 78 can operate as an induction machine. An interaction between the rotary magnetic field generated by the second rotor winding 80 and the induced current flowing through the second stator winding 70 causes a torque to act between the second stator 66 and the second rotor 78. Therefore, the torque generated by the engine 36 can be received as not only a torque to be generated between the first rotor 28 and the third rotor 18 but also as a torque to be generated between the second stator 66 and the second rotor 78. As described above, the present embodiment can cause a torque to act between the first rotor 28 and the third rotor 18, a torque to act between the first stator 16 and the third rotor 18, and a torque to act between the second stator 66 and the second rotor 78. Therefore, the present embodiment can improve the torque transmission capacity (torque transmission density).

In a state where the torque is transmitted from the engine 36 to the wheels 38, a rotational difference between the first/second rotors 28, 78 and the third rotor 18 can be allowed. The electric rotary machine 10 can function as a move-off apparatus. Therefore, it is unnecessary to provide a dedicated move-off apparatus (such as a friction clutch or a torque converter). Moreover, power transmission between the first/second rotors 28, 78 and the third rotor 18 can be performed without controlling the switching operation of the inverter 40 (without supplying electric power from the electric storage apparatus 42 to the first stator winding 20). Therefore, the power of the engine 36 can be transmitted to the wheels 38 even in a state where an amount of electricity stored in the electric storage apparatus 42 is small, or in an extremely low-temperature situation.

According to the above-described Patent Literature 1, the frequency of AC power that can be recovered by the transformation-rotor and the transformation-stator is proportional to a difference between the rotational speed of the first rotor and the rotational speed of the second rotor, and is not synchronous with the rotational speed of the first rotor. Therefore, an inverter that supplies electric power to the stator winding and an inverter that supplies electric power to the transformation-stator winding are separately required. On the other hand, in the present embodiment, the frequency f2 of the AC power recovered by the second stator 66 can be aligned with the synchronous driving frequency of the rotational speed Nout of the third rotor 18 by equalizing the number of poles P1 of the first rotor 28 with the number of poles P2 of the second rotor 78. Therefore, the AC power recovered by the second stator winding 70 can be supplied to the first stator winding 20 without converting the frequency to synchronously drive the third rotor 18. As a result, an inverter can be commonly used. The apparatus can be simplified in structure. Furthermore, the AC power recovered by the second stator winding 70 can be supplied to the first stator winding 20 without using the inverter, and can be used to rotate/drive the third rotor 18. Therefore, the inverter is not required to have a large capacity. The efficiency can thus be improved. The phase adjustment circuit 43 can adjust the phase of the AC power supplied from the second stator winding 70 to the first stator winding 20, so as to adjust the torque acting between the first stator 16 and the third rotor 18.

According to the above-described Patent Literature 1, no torque is generated between the transformation-rotor and the transformation-stator. Therefore, in an engine start up operation, it is necessary to generate a torque that acts from the stator to the second rotor via the first rotor to enable the engine to perform a cranking operation. Therefore, it is difficult to start up the engine independently of the driving wheels, and the efficiency in the engine startup operation is decreased. On the other hand, in the present embodiment, the electric power supplied from the electric storage apparatus 42 to the second stator winding 70 can be used to generate a torque that acts between the second stator 66 and the second rotor 78 to enable the engine 36 to perform a cranking operation. As a result, the engine 36 can efficiently perform the startup operation independently of the wheels 38.

Another example configuration according to the present embodiment is described below.

Figure 8:
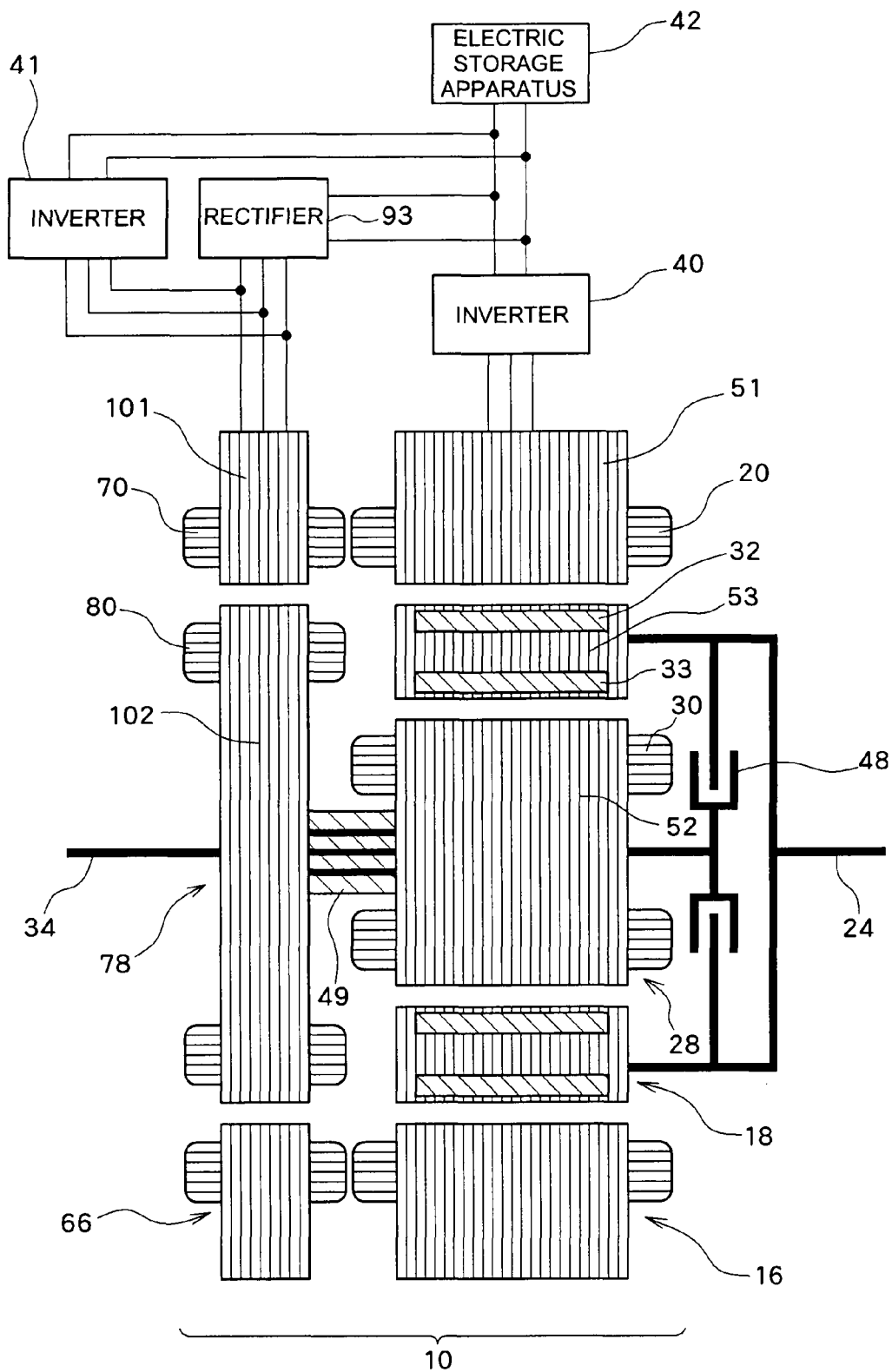
FIG. 8 illustrates another schematic configuration of the power transmission apparatus according to the first embodiment of the present invention.
Figure 9:
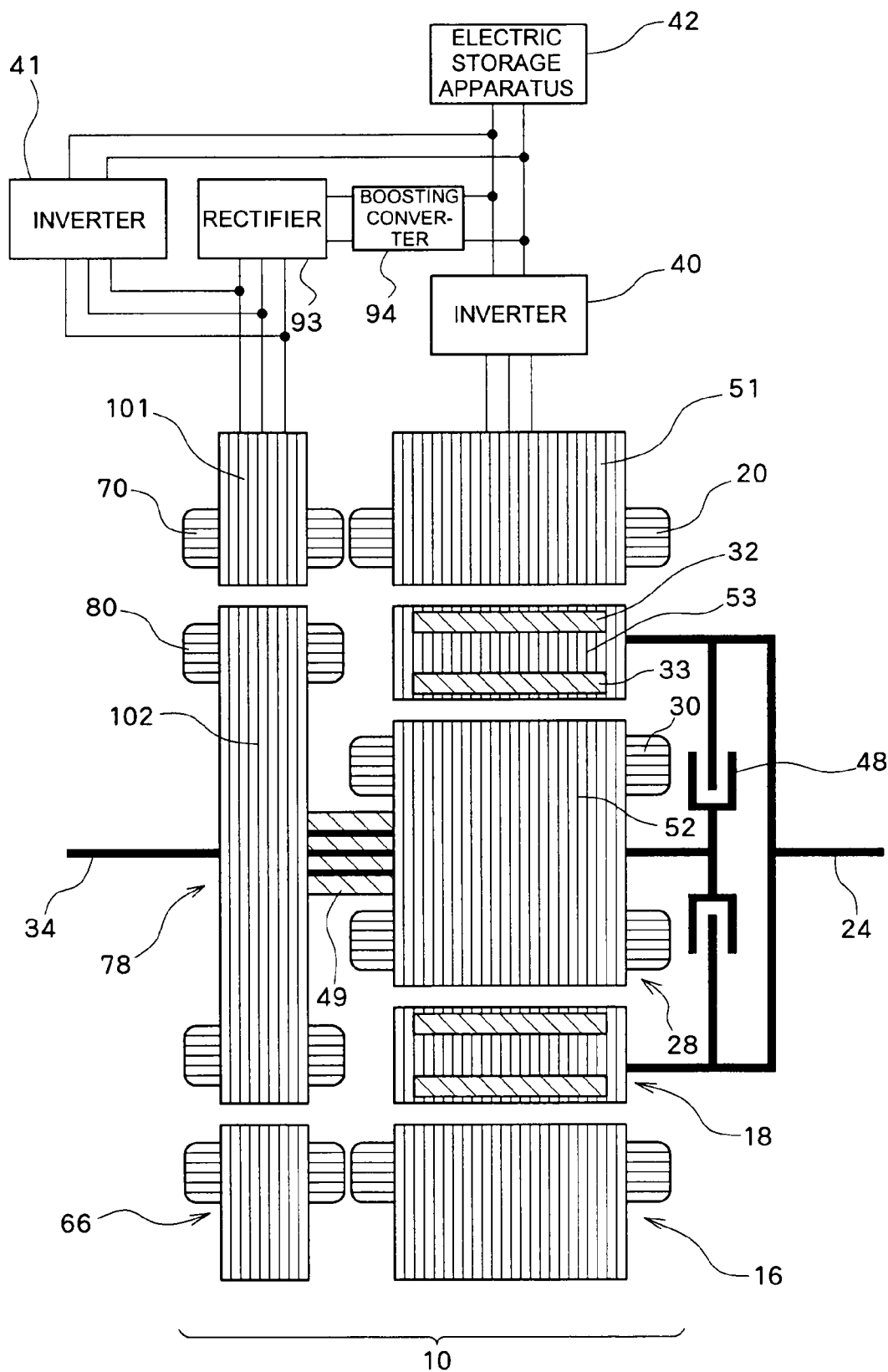
FIG. 9 illustrates another schematic configuration of the power transmission apparatus according to the first embodiment of the present invention.
Figure 10:
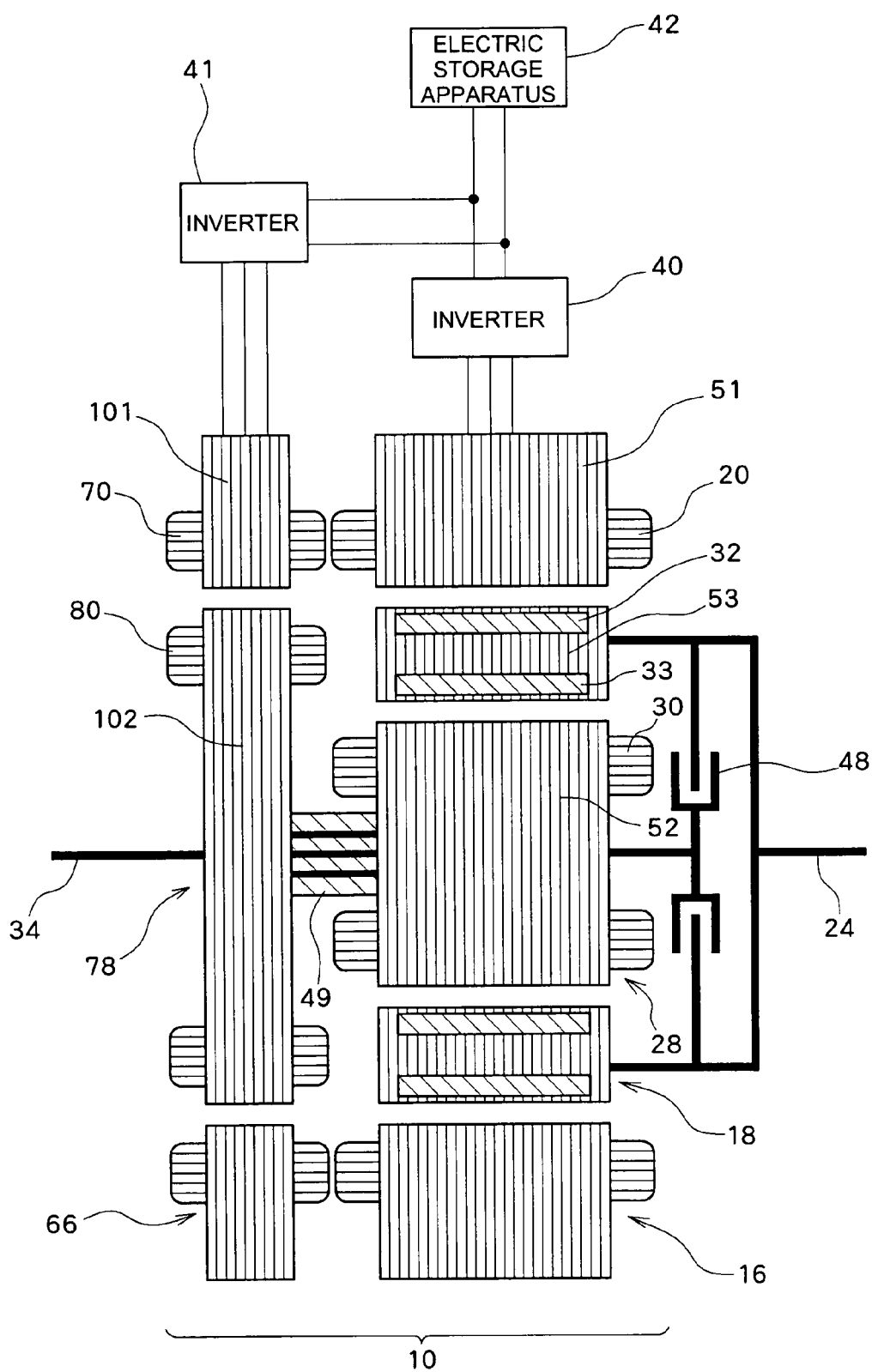
FIG. 10 illustrates another schematic configuration of the power transmission apparatus according to the first embodiment of the present invention.

In the present embodiment, the number of poles P1 of the first rotor 28 can be differentiated from the number of poles P2 of the second rotor 78. However, in the case of P1≠P2, the frequency f2 of the AC power recovered by the second stator 66 is not aligned with the synchronous driving frequency of the rotational speed Nout of the third rotor 18. In this case, as illustrated in FIG. 8, a rectifier 93 is provided to rectify the AC power recovered by the second stator winding 70. The inverter 40 converts the electric power rectified by the rectifier 93 into AC power and supplies the AC power to the first stator winding 20 to cause a torque to act between the first rotor 28 and the third rotor 18. Thus, the torque of the third rotor 18 can be amplified. Accordingly, irrespective of the numbers of poles P1 and P2, the electric power recovered by the second stator winding 70 can be used to rotate/drive the third rotor 18. Furthermore, the electric storage apparatus 42 can recover the electric power rectified by the rectifier 93. Moreover, as illustrated in FIG. 8, another inverter 41 is provided to convert the DC power of the electric storage apparatus 42 into AC (e.g., three-phase AC) electric power. The inverter 41 can supply the converted power to each phase of the second stator winding 70. The startup operation of the engine 36 can be performed with the electric power supplied to the second stator winding 70 by controlling the switching operation of the inverter 41 in such a way as to supply electric power from the electric storage apparatus 42 to the second stator winding 70. Furthermore, as illustrated in FIG. 9, a boosting converter (a DC-DC converter) 94 can be additionally provided to boost (convert) a voltage of the electric power rectified by the rectifier 93 and output the electric power which voltage is boosted (converted). According to the example illustrated in FIG. 9, the output electric power of the boosting converter 94 can be supplied to either the inverter 40 or the electric storage apparatus 42. The electric power to be supplied from the rectifier 93 to the inverter 40 (or the electric storage apparatus 42) can be adjusted by the control of the boosting converter 94. If the inverter 41 can convert the AC current flowing through each phase of the second stator winding 70 into DC current in such a way as to recover the electric energy in the electric storage apparatus 42, the rectifier 93 can be removed as illustrated in FIG. 10.

In a case where the first rotor winding 30 and the second rotor winding 80 are connected as illustrated in FIG. 5 (when the rotational directions of the magnetic fields are the same), the torque acting between the second stator 66 and the second rotor 78 and the torque acting between the first rotor 28 and the third rotor 18 have the same direction if the number of poles P2 of the second rotor 78 is set to be equal to or greater than the number of poles P1 of the first rotor 28 (P2≥P1), as understood from the above-described formula (4). Accordingly, the load torque that may be received by the engine 36 is equal to a sum of the torque acting on the second rotor 78 and the torque acting on the first rotor 28. Thus, the load torque received by the engine 36 can be increased.

In the present embodiment, the first rotor winding 30 and the second rotor winding 80 can be connected to have opposite phases, so that the rotational directions of the rotary magnetic fields of the first rotor winding 30 and the second rotor winding 80 that may be generated in a case where AC current flows through the first rotor winding 30 and the second rotor winding 80 become mutually opposite. For example, in a case where the first rotor winding 30 and the second rotor winding 80 are constituted by a 3-phase winding having U-phase, V-phase, and W-phase, the rotational directions of the magnetic fields generated by the first rotor winding 30 and the second rotor winding 80 become opposite if the U-phase of the first rotor winding 30 is connected to the U-phase of the second rotor winding 80, the V-phase of the first rotor winding 30 is connected to the W-phase of the second rotor winding 80, and the W-phase of the first rotor winding 30 is connected to the V-phase of the second rotor winding 80 (if the same phase windings are connected to each other for one of three phases, and different phase windings are connected for two of three phases), as illustrated in FIG. 11.

Figure 11:
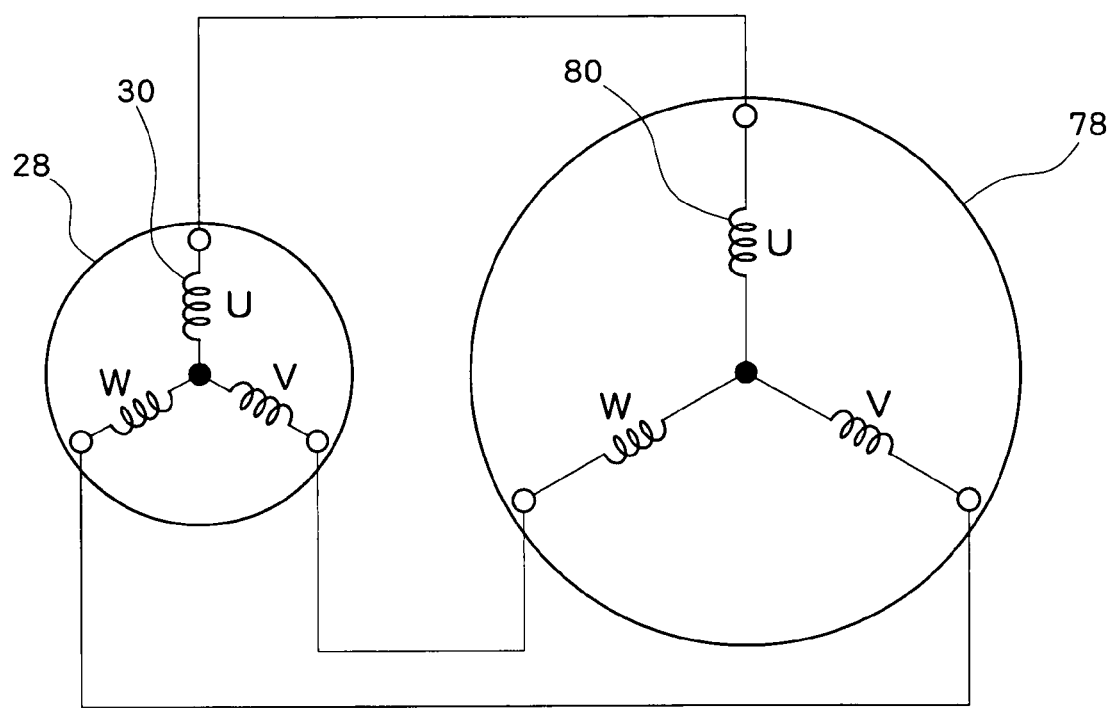
FIG. 11 illustrates another example of the connection between the first rotor winding 30 and the second rotor winding 80.

When the first rotor winding 30 and the second rotor winding 80 are connected as illustrated in FIG. 11 (when the rotational directions of the magnetic fields are opposite), the second stator 66 (the second stator winding 70) can recover AC power having frequency f2 [Hz] expressed by the following formula (6).

$$f2 = P2/120 \times (1 + P1/P2 \times s) \times Ne \qquad (6)$$

In this case, as understood from the formula (6), irrespective of the number of poles P1 of the first rotor 28 and the number of poles P2 of the second rotor 78, the torque acting between the second stator 66 and the second rotor 78 and the torque acting between the first rotor 28 and the third rotor 18 have the same direction. Therefore, the load torque that may be received by the engine 36 is equal to a sum of the torque acting on the second rotor 78 and the torque acting on the first rotor 28. Thus, the load torque received by the engine 36 can be increased.

However, in this case, irrespective of the number of poles P1 of the first rotor 28 and the number of poles P2 of the second rotor 78, the frequency f2 of the AC power recovered by the second stator 66 is not aligned with the synchronous driving frequency of the rotational speed Nout of the third rotor 18. Therefore, as illustrated in FIG. 8, the rectifier 93 and the inverter 41 can be provided. The rectifier 93 rectifies the AC power recovered by the second stator winding 70 and the inverter 40 converts the electric power rectified by the rectifier 93 into AC power and supplies the AC power to the first stator winding 20. Therefore, the torque of the third rotor 18 can be amplified. Accordingly, irrespective of the connection condition between the first rotor winding 30 and the second rotor winding 80, the electric power recovered by the second stator winding 70 can be used to rotate/drive the third rotor 18. When the engine 36 performs a startup operation, the switching operation of the inverter 41 can be controlled so as to supply electric power from the electric storage apparatus 42 to the second stator winding 70, to enable the engine 36 to perform cranking with the electric power supplied to the second stator winding 70. As illustrated in FIG. 9, the boosting converter 94 can be additionally provided.

Figure 12:
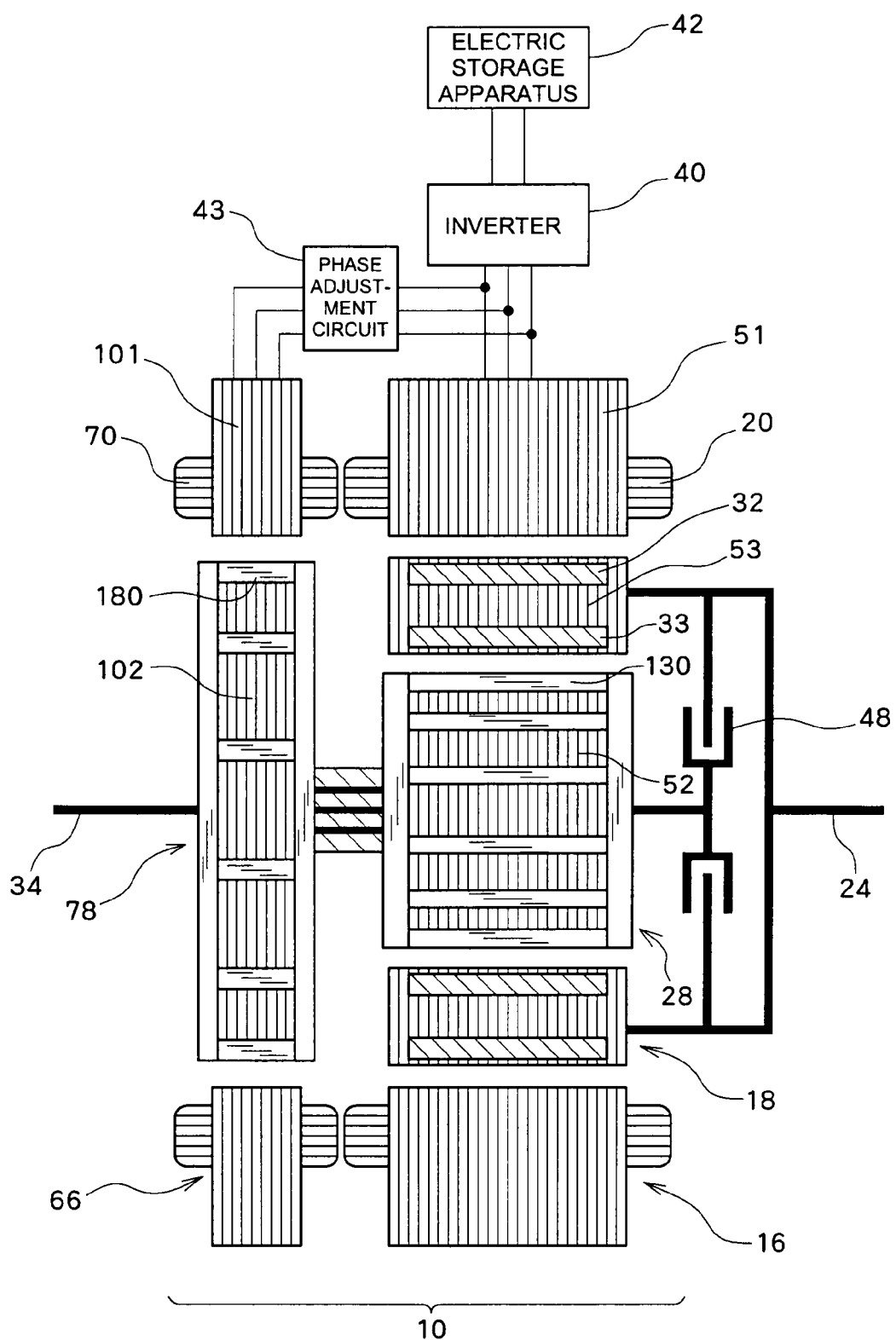
FIG. 12 illustrates another schematic configuration of the power transmission apparatus according to the first embodiment of the present invention.

Moreover, in the present embodiment, for example, as illustrated in FIG. 12, the first rotor 28 may have a first cage conductor 130 disposed in an opposed relationship with the third rotor 18 (the permanent magnets 33), and the second rotor 78 may have a second cage conductor 180 disposed in an opposed relationship with the second stator 66 (teeth around which the second stator winding 70 is wound). The first cage conductor 130 and the second cage conductor 180 are electrically connected. According to this example, if the number of poles P1 of the permanent magnets 33 of the third rotor 18 is set to be identical to the number of poles P2 of the second stator 66 (P1=P2), the frequency f2 of the AC power recovered by the second stator 66 is aligned with the synchronous driving frequency of the rotational speed Nout of the third rotor 18. Therefore, the AC power recovered by the second stator winding 70 can be supplied to the first stator winding 20 without converting the frequency to synchronously drive the third rotor 18. In this case, the phase adjustment circuit 43 adjusts the phase of the AC power supplied from the second stator winding 70 to the first stator winding 20. Therefore, the torque acting between the first stator 16 and the third rotor 18 can be adjusted.

On the other hand, in the case of P1≠P2, the frequency f2 of the AC power recovered by the second stator 66 is not aligned with the synchronous driving frequency of the rotational speed Nout of the third rotor 18. Therefore, instead of using the phase adjustment circuit 43, the rectifier 93 and inverter 41 (refer to FIG. 8) can be provided. Additionally, the boosting converter (refer to FIG. 9) can be provided.

If the number of poles P2 of the second stator 66 is set to be equal to or greater than the number of poles P1 of the permanent magnets 33 of the third rotor 18 (P2≥P1), the torque acting between the second stator 66 and the second rotor 78, and the torque acting between the first rotor 28 and the third rotor 18, have the same direction. Therefore, the load torque that may be received by the engine 36 is equal to a sum of the torque acting on the second rotor 78 and the torque acting on the first rotor 28.

Figure 13:
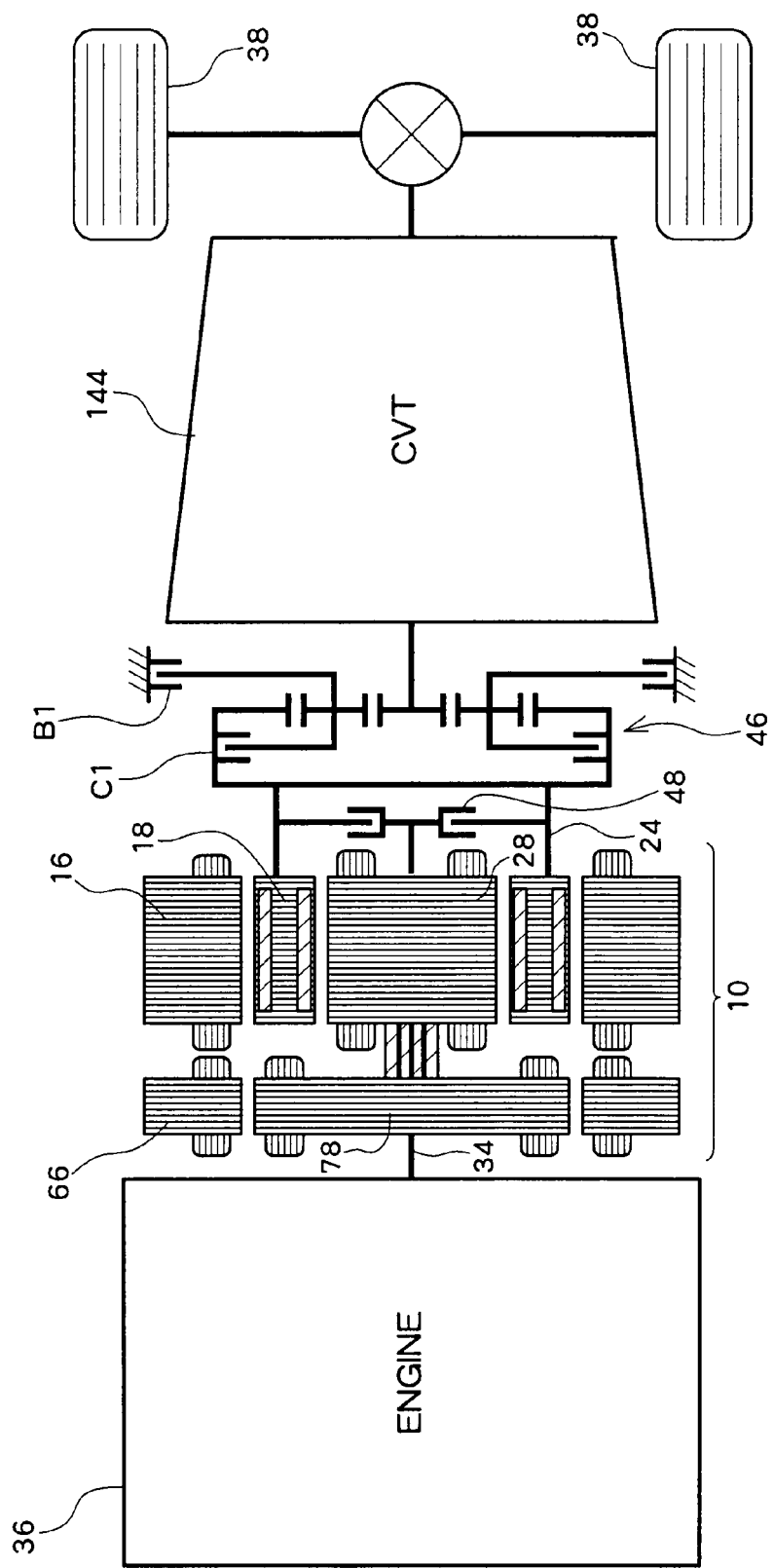
FIG. 13 illustrates another schematic configuration of a hybrid driving apparatus including a power transmission apparatus according to the first embodiment of the present invention.
Figure 14:
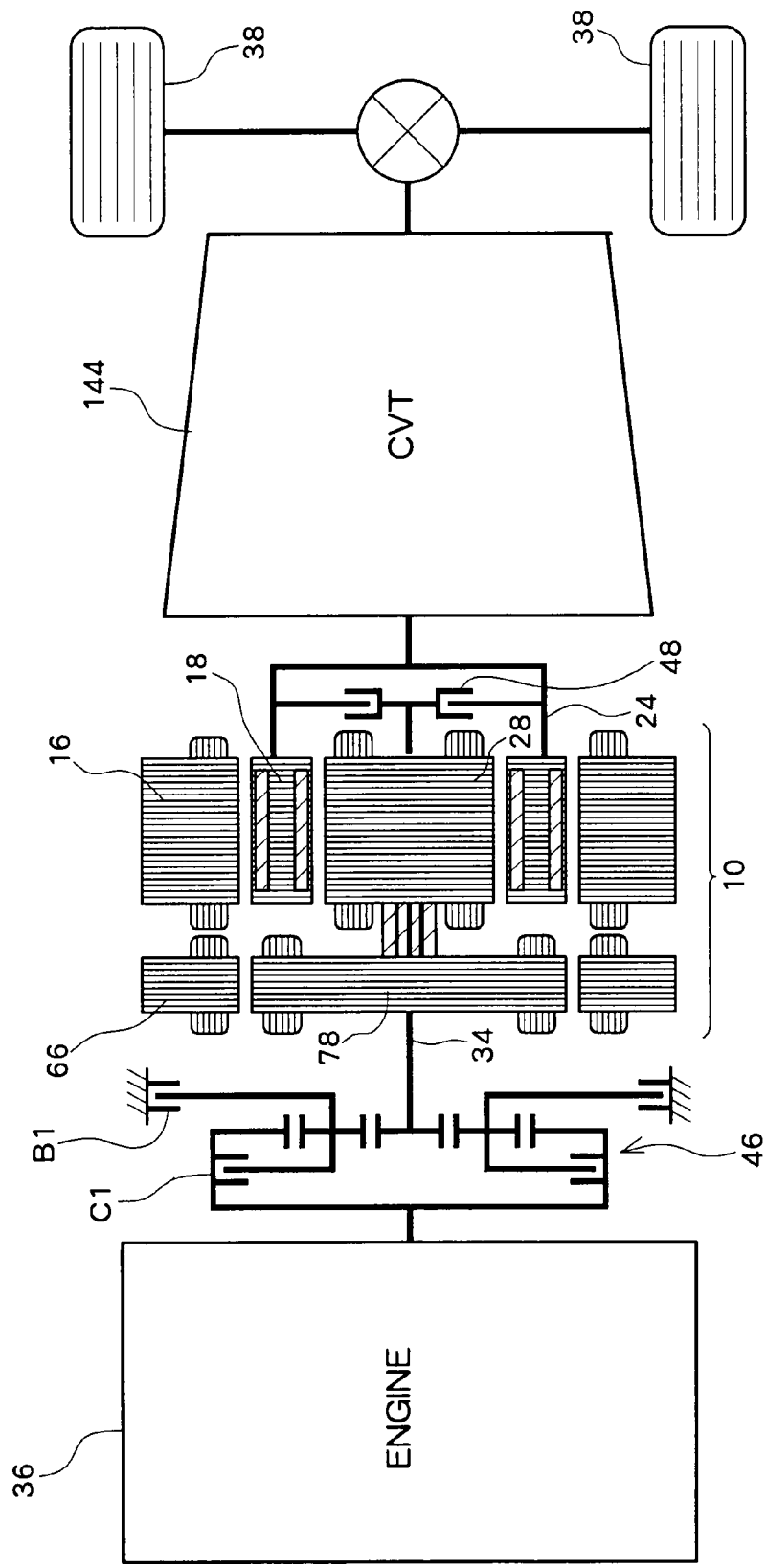
FIG. 14 illustrates another schematic configuration of the hybrid driving apparatus including the power transmission apparatus according to the first embodiment of the present invention.

Furthermore, in the present embodiment, for example, as illustrated in FIGS. 13 and 14, a continuously variable transmission (CVT) 144 can be disposed between the electric rotary machine 10 and the wheels 38. According to the example illustrated in FIG. 13, a forward-reverse switching apparatus 46 is disposed between the electric rotary machine 10 and the continuously variable transmission 144. According to the example illustrated in FIG. 14, the forward-reverse switching apparatus 46 is disposed between the engine 36 and the electric rotary machine 10. The forward-reverse switching apparatus 46 outputs an input torque (a torque of the third rotor 18 according to the example illustrated in FIG. 13, or a torque of the engine 36 according to the example illustrated in FIG. 14) without reversing its direction in a state where a clutch C1 is engaged and a brake B1 is released. The forward-reverse switching apparatus 46 outputs an input torque while reversing its direction in a state where the brake B1 is engaged and the clutch C1 is released. If both the clutch C1 and the brake B1 are in a released state, no torque transmission can be performed between input/output shafts of the forward-reverse switching apparatus 46. According to the example illustrated in FIG. 14, when an EV traveling operation is performed, the forward-reverse switching apparatus 46 brings both the clutch C1 and the brake B1 into the released state to prevent the engine 36 from being propelled by the torque generated between the first rotor 28 and the third rotor 18. Therefore, loss of the engine 36 that may be caused when the engine 36 is propelled can be reduced.

In the present embodiment, the input shaft 34 and the output shaft 24 of the electric rotary machine 10 can be switched. More specifically, the third rotor 18 can be mechanically connected to the engine 36. The first and second rotors 28 and 78 can be mechanically connected to the wheels 38 via the transmission 44. In this case, the power of the engine 36 can be transmitted to the third rotor 18 while power of the first and second rotors 28 and 78 can be transmitted to the wheels 38. In this case, a torque of the output shaft 24 can be received as a torque generated between the first rotor 28 and the third rotor 18 and a torque generated between the second stator 66 and the second rotor 78. The electric power supplied from the electric storage apparatus 42 to the second stator winding 70 causes a torque that acts between the second stator 66 and the second rotor 78 to enable the vehicle to perform the EV traveling operation.

[Second Embodiment]

Figure 15:
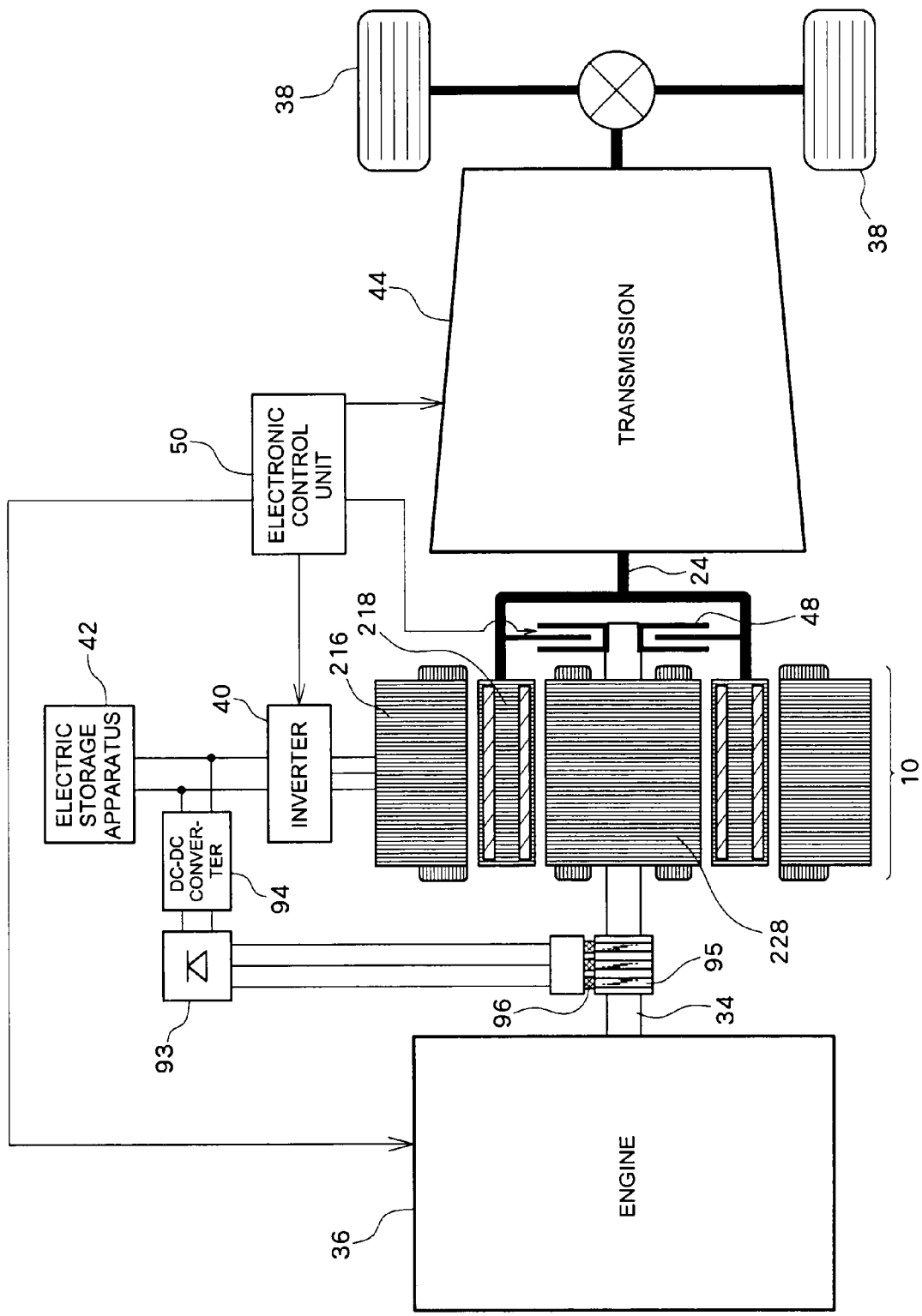
FIG. 15 illustrates a schematic configuration of a hybrid driving apparatus including a power transmission apparatus according to a second embodiment of the present invention.
Figure 16:
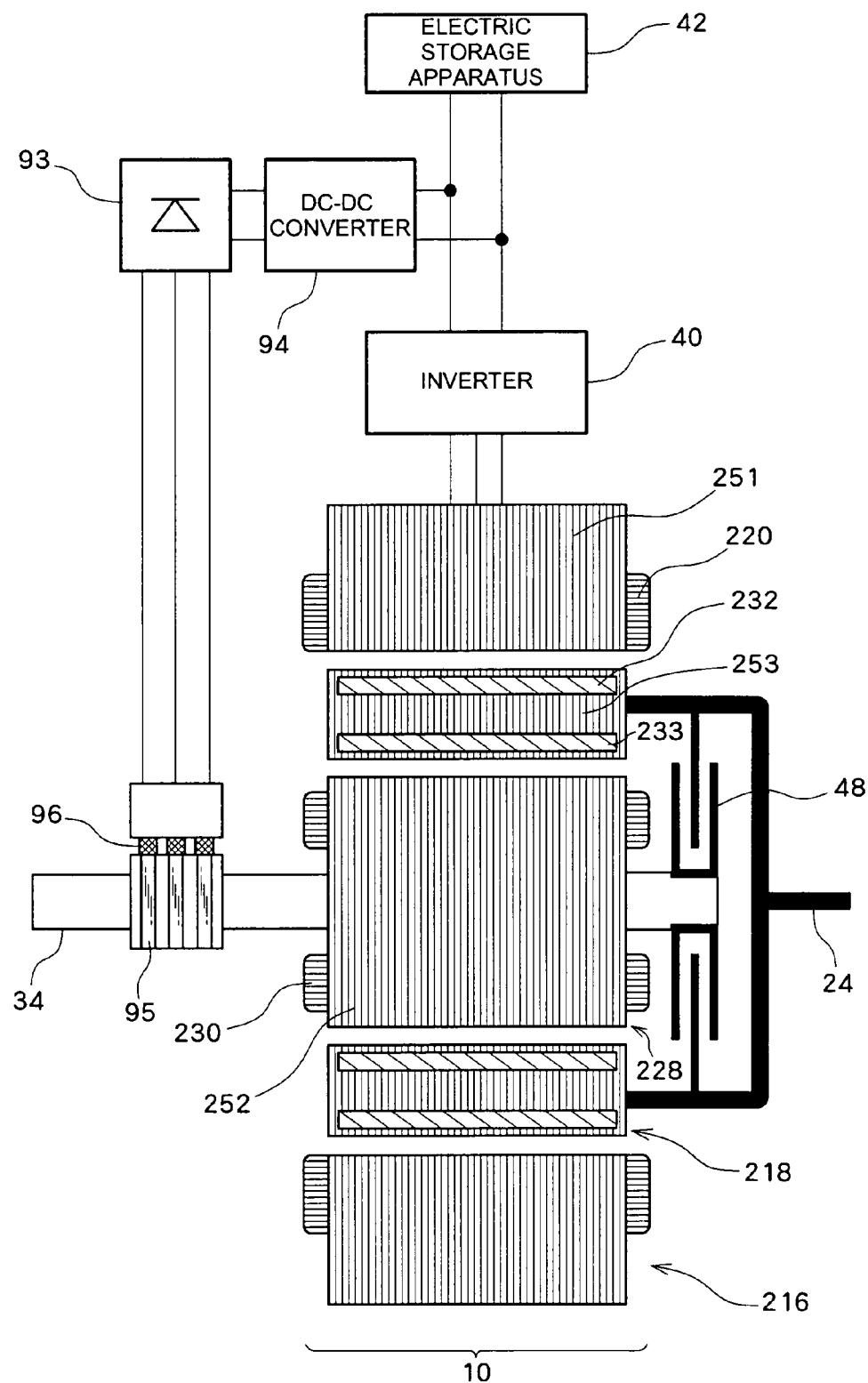
FIG. 16 illustrates a schematic configuration of the power transmission apparatus according to the second embodiment of the present invention.

FIGS. 15 and 16 illustrate a schematic configuration of a hybrid driving apparatus including a power transmission apparatus according to a second embodiment of the present invention. FIG. 15 illustrates an overall configuration of the hybrid driving apparatus. FIG. 16 illustrates a configuration of the electric rotary machine 10. In the following description of the second embodiment, components similar or corresponding to those described in the first embodiment are denoted by the same reference numerals and their descriptions are not repeated.

In the present embodiment, the electric rotary machine 10 includes a stator 216 fixed to a casing (not illustrated), a first rotor 228 that is disposed on the radial inner side of the stator 216 and can rotate relative to the stator 216, and a second rotor 218 that is disposed between the stator 216 and the first rotor 228 and can rotate relative to the stator 216 and the first rotor 228. As the first rotor 228 is mechanically connected to the input shaft 34 of the electric rotary machine 10, the first rotor 228 can receive power of the engine 36. On the other hand, as the second rotor 218 is mechanically connected to the output shaft 24 of the electric rotary machine 10, the wheels 38 can receive power of the second rotor 218 via the transmission 44 while changing speed. In the following description, the first rotor 228 is referred to as an input side rotor and the second rotor 218 is referred to as an output side rotor.

The stator 216 has a configuration similar to that of the first stator 16 described in the first embodiment. The stator 216 includes a stator core 251 and a stator winding (a stationary element conductor) 220 having multiple phases (e.g., three phases) disposed along a circumferential direction of the stator core 251. When multiple-phase (e.g., three-phase) AC current flows through the multiple-phase stator winding 220, the stator winding 220 can generate a rotary magnetic field that rotates in a stator circumferential direction. The stator core 251 has a configuration similar to that of the stator core 51 described in the first embodiment. The stator winding 220 has a configuration similar to that of the first stator winding 20 described in the first embodiment.

The input side rotor 228 has a configuration similar to that of the first rotor 28 described in the first embodiment. The input side rotor 228 includes a rotor core 252 and a rotor winding (a rotary element conductor) 230 having multiple phases (e.g., three phases) disposed along a circumferential direction of the rotor core 252. When multiple-phase (e.g., three-phase) AC current flows through the multiple-phase rotor winding 230, the rotor winding 230 can generate a rotary magnetic field that rotates in a rotor circumferential direction. The rotor core 252 has a configuration similar to that of the rotor core 52 described in the first embodiment. The rotor winding 230 has a configuration similar to that of the first rotor winding 30 described in the first embodiment.

The output side rotor 218 has a configuration similar to that of the third rotor 18 described in the first embodiment. The output side rotor 218 includes a rotor core 253 and permanent magnets 232 and 233 disposed in a circumferential direction of the rotor core 253. The permanent magnets 232 and 233 generate field fluxes. The permanent magnets 232 are disposed on an outer circumferential portion of the rotor core 253 in a confronting relationship with the stator 216 (the stator core 251). The permanent magnets 233 are disposed on an inner circumferential portion of the rotor core 253 in a confronting relationship with the input side rotor 228 (the rotor core 252). The rotor core 253 has a configuration similar to that of the rotor core 53 described in the first embodiment. The permanent magnets 232 and 233 have configurations similar to those of the permanent magnets 32 and 33 described in the first embodiment. The clutch 48 can selectively perform an engaging operation and a releasing operation to mechanically engage or disengage the input shaft 34 (the input side rotor 228) with or from the output shaft 24 (the output side rotor 218).

The slip ring 95 is mechanically connected to the input side rotor 228 and electrically connected to each phase of the rotor winding 230 and a brush 96. The slip ring 95 rotates together with the input side rotor 228, while causing a slip relative to the brush 96 that is fixed in a stationary manner (while maintaining an electric connection with the brush 96). The brush 96 is electrically connected to the rectifier 93 so that electric power can be supplied from the brush 96 to the rectifier 93. The slip ring 95 and the brush 96 can constitute an electric power transmission unit that can take out electric power (AC power) from the rotor winding 230 of the input side rotor 228 and can supply the taken out AC power to the rectifier 93.

The rectifier 93 rectifies and converts the AC power of the rotor winding 230 taken out by the slip ring 95 and the brush 96 into DC power. The boosting converter (DC-DC converter) 94 includes a switching element, which performs a switching operation to boost (convert) a voltage of the DC power rectified by the rectifier 93 and output the electric power which voltage is boosted (converted). The DC power which voltage is boosted (converted) by the boosting converter 94 can be converted into AC electric power by the inverter 40 and can be supplied to each phase of the stator winding 220. Furthermore, the DC power which voltage is boosted (converted) by the boosting converter 94 can be recovered in the electric storage apparatus 42. In this manner, the rectifier 93 and the boosting converter 94 can constitute an electric power conversion unit that can convert the AC power taken out from the slip ring 95 and the brush 96, and can supply the converted power to each phase of the stator winding 220. The rectifier 93 performs one-way electric power conversion in a direction from the slip ring 95 side to the boosting converter 94 side. The boosting converter 94 performs one-way electric power conversion in a direction from the rectifier 93 side to the electric storage apparatus 42 side (or the inverter 40 side). Therefore, the electric power conversion unit including the rectifier 93 and the boosting converter 94 performs one-way electric power conversion in a direction from the slip ring 95 side to the electric storage apparatus 42 side (or the inverter 40 side).

When multiple-phase (e.g., three-phase) AC current flows through the multiple-phase stator winding 220, the stator winding 220 generates a rotary magnetic field that rotates in a stator circumferential direction. An electromagnetic interaction (attraction and repulsion functions) between the rotary magnetic field generated by the stator winding 220 and the field fluxes generated by the permanent magnet 232 can generate a torque (magnet torque) which acts on the output side rotor 218 so as to rotate/drive the output side rotor 218. As described above, when the rotary magnetic field generated by the stator winding 220 interacts with the output side rotor 218 through an electromagnetic coupling between the stator winding 220 of the stator 216 and the permanent magnets 232 of the output side rotor 218, a torque (a magnet torque) can be generated so as to act between the stator 216 and the output side rotor 218.

If the input side rotor 228 rotates relative to the output side rotor 218, an induced electromotive force appears across the rotor winding 230 according to a rotational difference generated between the input side rotor 228 (the rotor winding 230) and the output side rotor 218 (the permanent magnets 233). Thus, induced current corresponding to the induced electromotive force flows through the rotor winding 230 and a rotary magnetic field is generated. Further, an electromagnetic interaction between the rotary magnetic field generated by the induced current flowing through the rotor winding 230 and the field fluxes of the permanent magnets 233 can generate a torque that acts on the output side rotor 218 and can rotate/drive the output side rotor 218. As described above, when the rotor winding 230 of the input side rotor 228 is electromagnetically coupled with the permanent magnets 233 of the output side rotor 218, the torque (the magnet torque) according to an interaction between the rotary magnetic field generated by the rotor winding 230 and the output side rotor 218 acts between the input side rotor 228 and the output side rotor 218. Therefore, the power (the mechanical power) can be transmitted between the input side rotor 228 and the output side rotor 218. The electromagnetic coupling function can thus be realized.

To generate a torque between the input side rotor 228 and the output side rotor 218 with the induced current of the rotor winding 230, the electronic control unit 50 controls a duty ratio (a ratio of ON duration in a switching period) in a switching operation of the switching element (not illustrated) of the boosting converter 94 to control a boosting ratio (a voltage conversion ratio) of the boosting converter 94. In this case, the electronic control unit 50 controls the boosting ratio of the boosting converter 94 so that an output voltage of the boosting converter 94 becomes higher than the voltage of the electric storage apparatus 42. Accordingly, current flows from the boosting converter 94 to the wiring connecting the electric storage apparatus 42 and the inverter 40 and induced current flows through the rotor winding 230. A torque acts between the input side rotor 228 and the output side rotor 218. On the other hand, the electronic control unit 50 can control the boosting ratio of the boosting converter 94 so that the output voltage of the boosting converter 94 becomes lower than the voltage of the electric storage apparatus 42 in a state where the switching operation of the inverter 40 is not performed. In this case, even if a rotational difference is caused between the input side rotor 228 and the output side rotor 218, no induced current flows through the rotor winding 230 and no torque acts between the input side rotor 228 and the output side rotor 218. If the switching element in the boosting converter 94 is maintained in an OFF state to stop the boosting (voltage conversion) operation of the boosting converter 94, no induced current flows through the rotor winding 230 and no torque acts between the input side rotor 228 and the output side rotor 218.

In the hybrid driving apparatus according to the present embodiment, the power of the engine 36, when generated, can be transmitted to the input side rotor 228 to rotate/drive the input side rotor 228. If the rotational speed of the input side rotor 228 exceeds the rotational speed of the output side rotor 218, the induced electromotive force appears across the rotor winding 230. The electronic control unit 50 controls the boosting ratio of the boosting converter 94 so that the output voltage of the boosting converter 94 becomes higher than the voltage of the electric storage apparatus 42. The induced current flows through the rotor winding 230. The electromagnetic interaction between the induced current and the field fluxes of the permanent magnets 233 causes a torque to act on the output side rotor 218 in such a way as to rotate/drive the output side rotor 218. As described above, the power transmitted from the engine 36 to the input side rotor 228 can be transmitted to the output side rotor 218 through the electromagnetic coupling between the rotor winding 230 of the input side rotor 228 and the permanent magnets 233 of the output side rotor 218. The power transmitted to the output side rotor 218 can be further transmitted via the transmission 44 while changing speed to the wheels 38 to drive an automotive vehicle (a load). The following formula (7) expresses an engine output power $Po\omega_{eng}$ in a case where the engine 36 (the input side rotor 228) rotates at a rotational speed $\omega_e$ and with a torque $T_e$ to drive a load. The following formula (8) expresses a transmission power $Po\omega_{coup}$ that can be obtained by an electromagnetic coupling between the input side rotor 228 and the output side rotor 218. The following formula (9) expresses generation power $Po\omega_{ele}$ of the rotor winding 230. In the formulae (8) and (9), "s" represents the slip between the input side rotor 228 and the output side rotor 218, which can be expressed by the following formula (10). In the formula (10), $\omega_{out}$ represents a rotational speed of the output side rotor 218.

$$Po\omega_{eng} = T_e \times \omega_e \quad (7)$$

$$Po\omega_{coup} = (1-s) \times T_e \times \omega_e \quad (8)$$

$$Po\omega_{ele} = s \times T_e \times \omega_e \quad (9)$$

$$s = (\omega_e - \omega_{out})/\omega_e \quad (10)$$

Furthermore, the AC power generated by the rotor winding 230 is taken out via the slip ring 95 and the brush 96. The taken out AC power is rectified by the rectifier 93. A voltage of the rectified DC power is boosted by the boosting converter 94. The DC power from the boosting converter 94 is converted into AC power by the inverter 40 and supplied to the stator winding 220. Thus, the stator 216 forms a rotary magnetic field. An electromagnetic interaction between the rotary magnetic field of the stator 216 and field fluxes of the permanent magnets 232 of the output side rotor 218 generates a torque that acts on the output side rotor 218. Accordingly, a torque amplification function for amplifying the torque of the output side rotor 218 can be realized. Moreover, the DC power of the boosting converter 94 can be recovered in the electric storage apparatus 42.

Further, if the DC power of the electric storage apparatus 42 is converted into AC power by the inverter 40 and supplied to the stator winding 220, not only can the power of the engine 36 be used to rotate/drive the wheels 38 but also the power of the output side rotor 218, which can be generated with the electric power supplied to the stator winding 220, can be used to assist rotation/driving of the wheels 38. In a load decelerating operation, the electronic control unit 50 controls the switching operation of the inverter 40 in such a way as to recover electric power from the stator winding 220 to the electric storage apparatus 42. Thus, the power of the load can be converted into electric power of the stator winding 220 through an electromagnetic coupling between the stator winding 220 and the permanent magnets 232, and can be recovered in the electric storage apparatus 42.

When the power of the engine 36 is used to rotate/drive the wheels 38, the electronic control unit 50 controls the boosting ratio (the voltage conversion ratio) of the boosting converter 94 to control the torque acting between the input side rotor 228 and the output side rotor 218. Accordingly, the electronic control unit 50 can control the torque $T_e$ of the engine 36. The reason for this is as follows.

Figure 17:
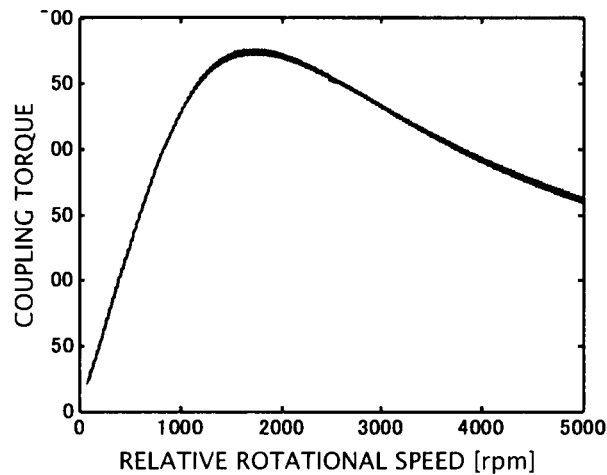
FIG. 17 illustrates an example of relative rotational speed-torque characteristics between an input side rotor 228 and an output side rotor 218.
Figure 18:
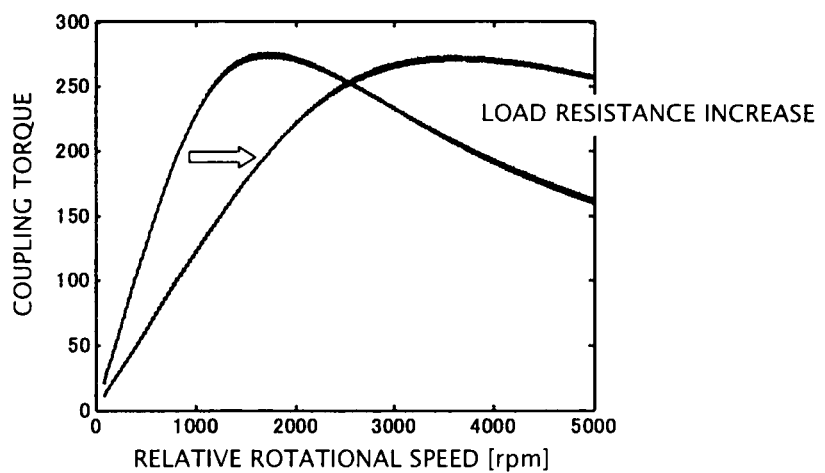
FIG. 18 illustrates an example of relative rotational speed-torque characteristics between the input side rotor 228 and the output side rotor 218.
Figure 19:
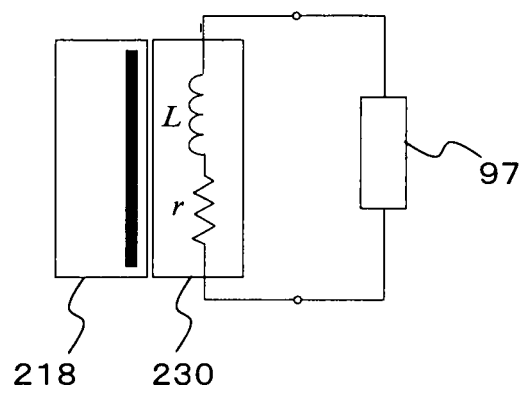
FIG. 19 illustrates an equivalent circuit of a rotor winding 230 and its external circuit 97.

The torque acting between the input side rotor 228 and the output side rotor 218 (hereinafter, referred to as an electromagnetic coupling torque) changes according to a relative rotational speed between the input side rotor 228 and the output side rotor 218 and, in general, can be expressed using relative rotational speed-to-torque characteristics illustrated in FIG. 17. Further, the relative rotational speed-to-torque characteristics are variable depending on a load resistance. As illustrated in FIG. 18, a peak value of electromagnetic coupling torque shifts to a higher side of the relative rotational speed if the load resistance increases (proportional transition). Therefore, the relative rotational speed-to-torque characteristics can be controlled by adjusting the load resistance. If the load resistance is adjusted to be a large value, the peak value of the electromagnetic coupling torque can be shifted to the higher side of the relative rotational speed. If the load resistance is adjusted to be a small value, the peak value of the electromagnetic coupling torque can be shifted to a lower side of the relative rotational speed. In this embodiment, the load resistance can be represented by an equivalent resistance of an external circuit 97 of the rotor winding 230 illustrated in FIG. 19. The external circuit 97 includes the slip ring 95, the brush 96, the rectifier 93, the boosting converter 94, the inverter 40, and the stator winding 220. In these elements, the boosting converter 94 and the inverter 40 are adjustable elements of the equivalent resistance (the load resistance).

Figure 20:
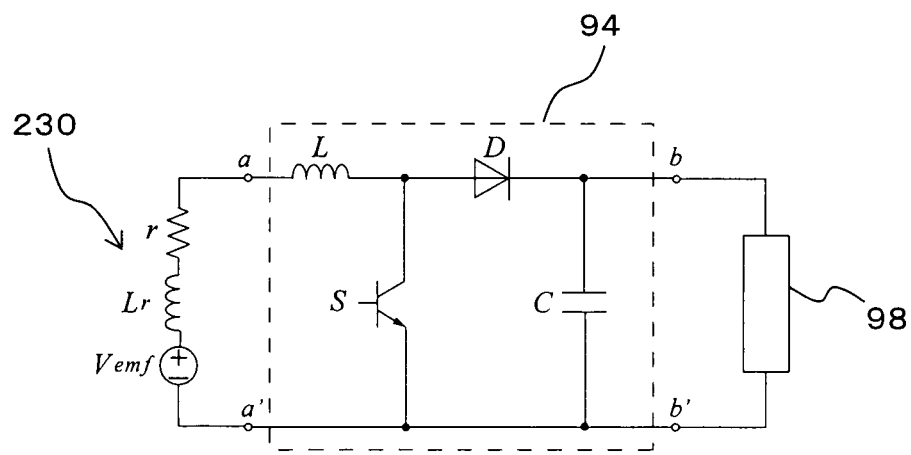
FIG. 20 illustrates an example configuration of a boosting converter 94.

FIG. 20 is an equivalent circuit illustrating detailed elements of the boosting converter 94, which are included in the external circuit 97. In FIG. 20, the external circuit 98 includes the inverter 40 and the stator winding 220. The boosting converter 94 includes a reactor L, a diode D, a switching element S, and a smoothing capacitor C. The boosting converter 94 can perform a switching operation for turning on and off the switching element S so as to control a boosting ratio $E_2/E_1$, in which $E_1$ represents an a-a' terminal voltage and $E_2$ represents a b-b' terminal voltage. If Ton represents an ON duration of the switching element S, Toff represents an OFF duration of the switching element S, T (=Ton+Toff) represents the switching period of the switching element S, and the following formula (11) defines a duty ratio "d" of the switching operation, the boosting ratio $E_2/E_1$ can be expressed by the following formula (12).

$$d = Ton/(Ton+Toff) \quad (11)$$

$$E_2/E_1 = 1/(1-d) \quad (12)$$

Figure 21:
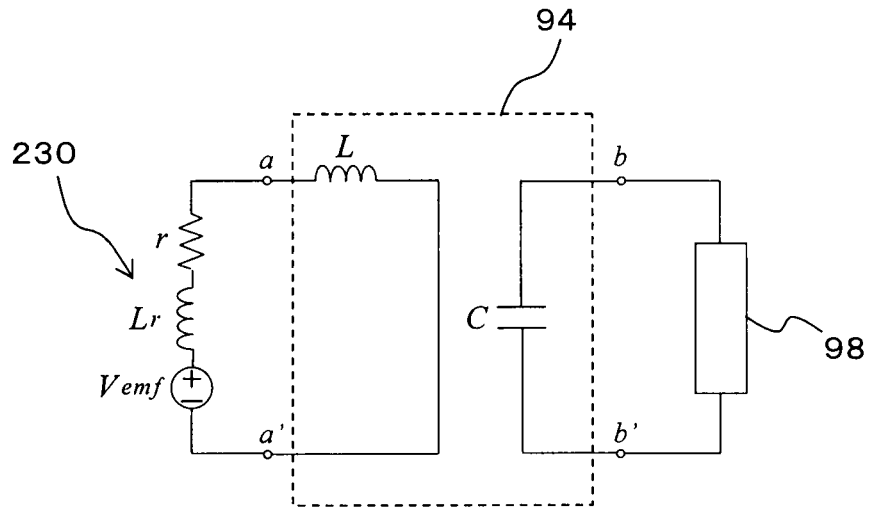
FIG. 21 illustrates an equivalent circuit in a case where a switching element S is in an ON state.
Figure 22:
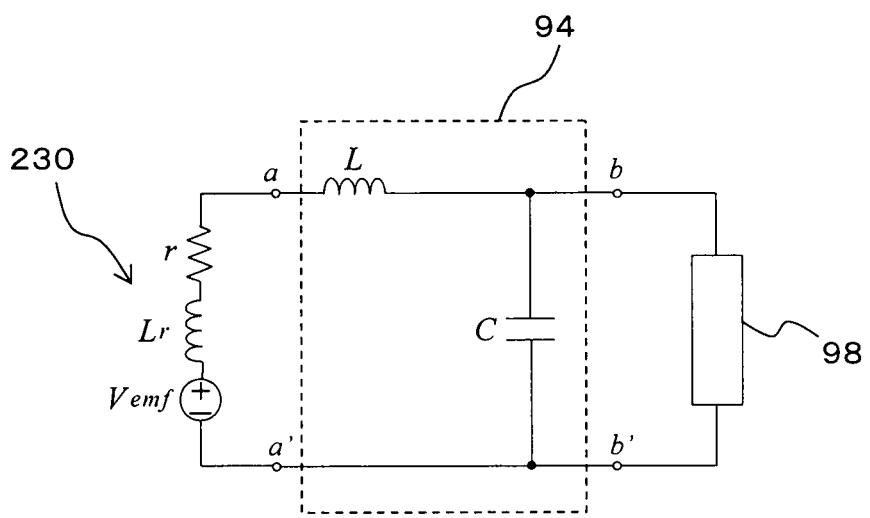
FIG. 22 illustrates an equivalent circuit in a state where the switching element S is in an OFF state.

FIG. 21 illustrates an equivalent circuit in a case where the switching element S is in an ON state. FIG. 22 illustrates an equivalent circuit in a case where the switching element S is in an OFF state. When the switching element S is in the On state (short-circuit state), the load resistance viewed from the rotor winding 230 side becomes lower. When the switching element S is in the OFF state, the load resistance viewed from the rotor winding 230 side becomes higher (compared to the case where the switching element S is in the On state). Therefore, if the proportion of the On state of the switching element S is increased (when the boosting ratio is increased to increase the duty ratio "d"), the equivalent resistance of the load side becomes a low value. If the proportion of the OFF state of the switching element S is increased (when the boosting ratio is reduced to reduce the duty ratio "d"), the equivalent resistance of the load side becomes a higher value. Furthermore, the equivalent resistance of the load side can be further increased to a higher value by maintaining the switching element of the inverter 40 in an OFF state. Accordingly, if the boosting ratio of the boosting converter 94 is increased to reduce the load resistance viewed from the rotor winding 230 side, the peak value of the electromagnetic coupling torque can be shifted to the lower side of the relative rotational speed. On the other hand, if the boosting ratio of the boosting converter 94 is reduced to increase the load resistance viewed from the rotor winding 230 side, the peak value of the electromagnetic coupling torque can be shifted to a higher side of the relative rotational speed.

The following formula (13) expresses the rotational speed $\omega_e$ of the engine 36, in which $T_e$ represents the torque of the engine 36, $T_c$ represents the electromagnetic coupling torque, and $J_e$ represents an engine axial inertia.

[Numerical Expression 1]

$$J_e \dot{\omega}_e = T_e - T_c \quad (13)$$

Figure 25:
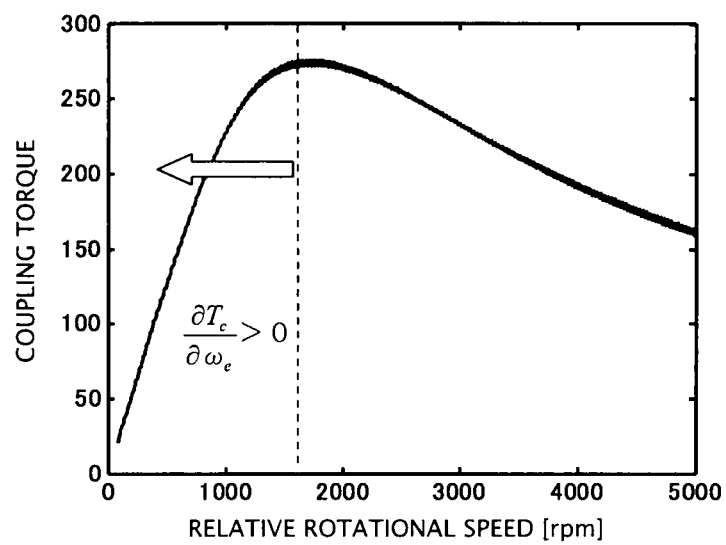
FIG. 25 illustrates a condition for stabilizing the behavior of the rotational speed $\omega_e$ of the engine 36.

It is now assumed that the torque $T_e$ of the engine 36 and a rotational speed $\omega_{out}$ of the output shaft 24 (the output side rotor 218) are constant and in an equilibrium state where the torque $T_e$ of the engine 36 and an electromagnetic coupling torque $T_c$ are substantially equal at a rotational speed $\omega_{e0}$ of the engine 36. In this case, referring to FIGS. 23 and 24, a condition for stabilizing the behavior of the rotational speed $\omega_e$ of the engine 36 expressed by the following formula (13) in the vicinity of the rotational speed $\omega_{e0}$ can be expressed by the following formula (14). Therefore, it is necessary to cause the power transmission apparatus according to the present embodiment to operate in a range where the following formula (15) can be satisfied. FIG. 23 illustrates a case where the behavior of the rotational speed $\omega_e$ of the engine 36 is stabilized. FIG. 24 illustrates a case where the behavior of the rotational speed $\omega_e$ of the engine 36 becomes unstable. Accordingly, to stabilize the behavior of the rotational speed $\omega_e$ of the engine 36, as illustrated in FIG. 25, it is necessary to cause the power transmission apparatus according to the present embodiment to operate in a relative rotational speed range lower than a peak point where the electromagnetic coupling torque is maximized (a dotted line in FIG. 25).

[Numerical Expression 2]

$$\frac{\partial (T_e - T_c)}{\partial \omega_e} < 0 \quad (14)$$

$$\frac{\partial T_c}{\partial \omega_e} > 0 \quad (15)$$

From the foregoing, the electronic control unit 50 can control the electromagnetic coupling torque $T_c$, by controlling the boosting ratio of the boosting converter 94, and can control the torque $T_e$ of the engine 36. For example, if the boosting ratio of the boosting converter 94 is increased, the peak value of the electromagnetic coupling torque can be shifted to the lower side of the relative rotational speed and the electromagnetic coupling torque $T_c$ (the torque $T_e$ of the engine 36) can be increased. On the other hand, if the boosting ratio of the boosting converter 94 is reduced, the peak value of the electromagnetic coupling torque can be shifted to the higher side of the relative rotational speed. As a result, the electromagnetic coupling torque $T_c$ (the torque $T_e$ of the engine 36) can be reduced. The electromagnetic coupling torque $T_c$ can be further reduced if the switching element of the inverter 40 is maintained in the OFF state.

When the power of the engine 36 is used to rotate/drive the wheels 38, the rotational speed of the output side rotor 218 becomes higher if the rotational speed of the wheels 38 (the vehicle travelling speed) becomes higher. If induced current flows through the rotor winding 230 in a state where the rotational speed of the output side rotor 218 is higher than the rotational speed of the input side rotor 228, a torque (a braking torque) acts in such a way as to reduce the rotational speed of the output side rotor 218 and a braking force acts on the wheels 38 (the automotive vehicle). In this case, the electric power that is supplied from the electric storage apparatus 42 to the rotor winding 230 via the slip ring 95 can prevent the braking torque from acting on the output side rotor 218. However, to supply electric power from the electric storage apparatus 42 to the rotor winding 230 via the slip ring 95, an additional inverter different from the inverter 40 is required to be provided between the electric storage apparatus 42 and the slip ring 95 (the rotor winding 230) to realize a bidirectional electric power conversion, i.e., an electric power conversion for converting the DC power of the electric storage apparatus 42 into AC power to be supplied to the slip ring 95 (the rotor winding 230) and an electric power conversion for converting the AC power of the rotor winding 230 into DC power to be supplied to the electric storage apparatus 42 (or the inverter 40).

On the other hand, the present embodiment changes the gear ratio of the transmission 44 to a smaller side so that the rotational speed of the input side rotor 228 can be maintained to be higher than the rotational speed of the output side rotor 218, even if the rotational speed of the wheels 38 (the vehicle travelling speed) becomes higher, in a state where the power of the engine 36 is used to rotate/drive the wheels 38. In this state, the induced current of the rotor winding 230 flows in such a way as to generate a torque that can increase the rotational speed of the output side rotor 218. Therefore, the present embodiment can prevent the braking torque from acting on the output side rotor 218 (the wheels 38) without supplying electric power from the electric storage apparatus 42 to the rotor winding 230 via the slip ring 95. Therefore, the present embodiment performs only the electric power conversion for converting the AC power of the rotor winding 230 into DC power to be supplied to the electric storage apparatus 42 (or the inverter 40) as the electric power conversion to be performed between the electric storage apparatus 42 and the slip ring 95 (the rotor winding 230), and does not need to perform the electric power conversion for converting the DC power of the electric storage apparatus 42 into AC power to be supplied to the slip ring 95 (the rotor winding 230). As a result, it is only required to provide the rectifier 93 and the boosting converter (the DC-DC converter) 94 between the electric storage apparatus 42 and the slip ring 95 to perform the one-way electric power conversion (from the slip ring 95 side to the electric storage apparatus 42 side). Thus, the present embodiment does not require any inverter to perform the bidirectional electric power conversion. Accordingly, the present embodiment can prevent the braking torque from acting on the wheels 38 in the state where the power of the engine 36 is used to rotate/drive the wheels 38 without complicating the configuration of the power transmission apparatus and without increasing the cost of the apparatus.

Furthermore, in the present embodiment, if the rotational speed of the output side rotor 218 becomes higher than the rotational speed of the input side rotor 228 when the power of the engine 36 is used to rotate/drive the wheels 38, the electronic control unit 50 controls the boosting ratio of the boosting converter 94 (or the voltage conversion ratio of the DC-DC converter) to be a smaller value (or stops a boosting operation performed by the boosting converter 94) so that the output voltage of the boosting converter 94 becomes smaller than the voltage of the electric storage apparatus 42. Therefore, the present embodiment can prevent the induced current from flowing through the rotor winding 230. Accordingly, the present embodiment can prevent the braking torque from acting on the output side rotor 218 (the wheels 38) even if the rotational speed of the output side rotor 218 becomes higher than the rotational speed of the input side rotor 228. However, in the present embodiment, in a state where the power of the engine 36 is used to rotate/drive the wheels 38, it is preferable that the electronic control unit 50 controls the gear ratio of the transmission 44 so that the rotational speed of the output side rotor 218 becomes lower than the rotational speed of the input side rotor 228.

Another example configuration according to the present embodiment is described below.

Figure 26:
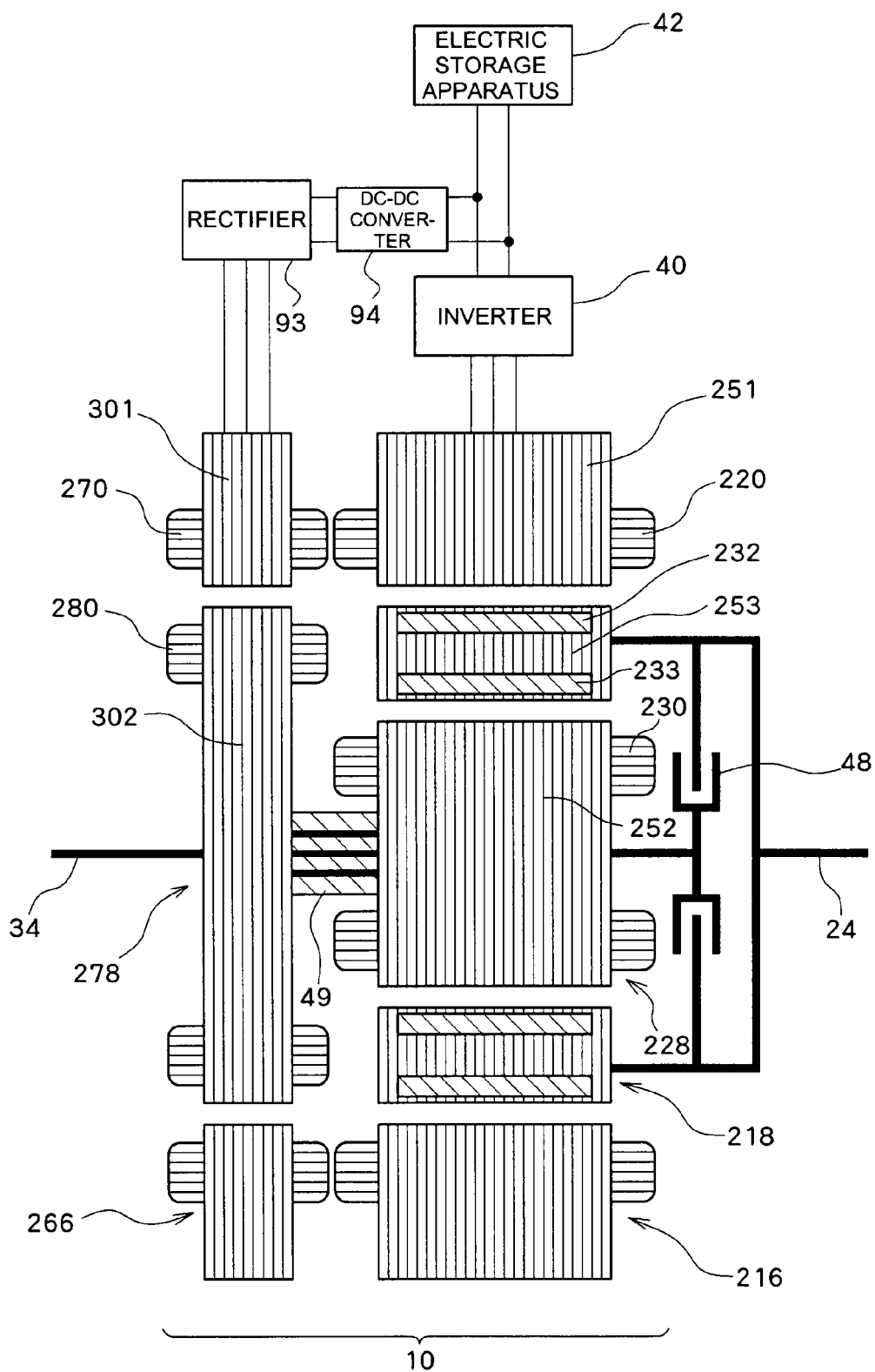
FIG. 26 illustrates another schematic configuration of the power transmission apparatus according to the second embodiment of the present invention.

An example configuration illustrated in FIG. 26 includes, as an electric power transmission unit that can take out electric power from the rotor winding 230 of the input side rotor 228, an electric power transmitting stator 266 fixed to a casing (not illustrated) and an electric power transmitting rotor 278 that is disposed on a radial inner side of the electric power transmitting stator 266 and can rotate relative to the electric power transmitting stator 266, instead of using the slip ring 95 and the brush 96 illustrated in FIGS. 15 and 16. The electric power transmitting stator 266 has a configuration similar to that of the second stator 66 described in the first embodiment. The electric power transmitting stator 266 includes a stator core 301 and an electric power transmitting stator winding (an electric power transmitting stationary element conductor) 270 having multiple phases (e.g., three phases) disposed along a circumferential direction of the stator core 301. The electric power transmitting stator winding 270 is electrically connected to the rectifier 93. When multiple-phase (e.g., three-phase) AC current flows through the multiple-phase electric power transmitting stator winding 270, the electric power transmitting stator winding 270 can generate a rotary magnetic field that rotates in a stator circumferential direction. The stator core 301 has a configuration similar to that of the stator core 101 described in the first embodiment. The electric power transmitting stator winding 270 has a configuration similar to that of the second stator winding 70 described in the first embodiment.

The electric power transmitting rotor 278 has a configuration similar to that of the second rotor 78 described in the first embodiment. The electric power transmitting rotor 278 includes a rotor core 302 and an electric power transmitting rotor winding (an electric power transmitting rotary element conductor) 280 having multiple phases (e.g., three phases) disposed along a circumferential direction of the rotor core 302. The electric power transmitting rotor 278 is mechanically coupled with the input side rotor 228. When multiple-phase (e.g., three-phase) AC current flows through the multiple-phase electric power transmitting rotor winding 280, the electric power transmitting rotor winding 280 can generate a rotary magnetic field that rotates in a rotor circumferential direction. The electric power transmitting rotor winding 280 is electrically connected (directly connected) to the rotor winding 230 of the input side rotor 228. In the present embodiment, the rotor winding 230 and the electric power transmitting rotor winding 280 are connected to have opposite phases, so that the rotational directions of the rotary magnetic fields of the rotor winding 230 and the electric power transmitting rotor winding 280 that may be generated in a case where AC current flows through the rotor winding 230 and the electric power transmitting rotor winding 280 become mutually opposite. The rotor core 302 has a configuration similar to that of the rotor core 102 described in the first embodiment. The electric power transmitting rotor winding 280 has a configuration similar to that of the second rotor winding 80 described in the first embodiment. The example configuration illustrated in FIG. 26 is similar to the example configuration illustrated in FIG. 9, although the inverter 41 is omitted.

In the example configuration illustrated in FIG. 26, the rotor winding 230 is electrically connected to the electric power transmitting rotor winding 280. Therefore, the induced current of the rotor winding 230 generated according to a rotational difference between the input side rotor 228 and the output side rotor 218 can flow through the electric power transmitting rotor winding 280. The induced current flowing through the electric power transmitting rotor winding 280 causes the electric power transmitting rotor 278 to form a rotary magnetic field. When the rotary magnetic field generated by the electric power transmitting rotor winding 280 interacts with the electric power transmitting stator 266, the electric power transmitting stator winding 270 generates an induced electromotive force. Thus, an induced current corresponding to the induced electromotive force flows through the electric power transmitting stator winding 270. The electric power conversion of the AC power generated by the electric power transmitting stator winding 270 is performed by the rectifier 93 that rectifies the AC power into DC power and the boosting converter 94 that boosts a voltage of the rectified AC power. Moreover, an electromagnetic interaction between the rotary magnetic field generated by the electric power transmitting rotor winding 280 and the induced current flowing through the electric power transmitting stator winding 270 generates a torque that acts between the electric power transmitting stator 266 and the electric power transmitting rotor 278. The torque acting between the electric power transmitting stator 266 and the electric power transmitting rotor 278 is the same in direction as the torque acting between the input side rotor 228 and the output side rotor 218. As described above, when the electric power transmitting rotor winding 280 and the electric power transmitting stator winding 270 are electromagnetically coupled, the electric power transmitting stator 266 and the electric power transmitting rotor 278 can function as a transformer. The AC power generated by the rotor winding 230 can be taken out without any contact. Furthermore, the electric power transmitting stator 266 and the electric power transmitting rotor 278 can function as an induction machine. However, in the present embodiment, even when the electric power transmitting stator 266 and the electric power transmitting rotor 278 are constituted so as to function as a transformer without functioning as an induction machine, the AC power generated by the rotor winding 230 can be taken out without any contact.

Even in the example configuration illustrated in FIG. 26, when the power of the engine 36 is used to rotate/drive the wheels 38, a state where the rotational speed of the input side rotor 228 is higher than the rotational speed of the output side rotor 218 can be maintained by changing the gear ratio of the transmission 44. Therefore, the present embodiment can prevent the braking torque from acting on the output side rotor 218 (the wheels 38) without supplying electric power from the electric storage apparatus 42 to the rotor winding 230 via the electric power transmitting stator winding 270.

Furthermore, according to the example configuration illustrated in FIG. 26, when the power of the engine 36 is used to rotate/drive the wheels 38, a torque acts between the electric power transmitting stator 266 and the electric power transmitting rotor 278. The following formula (16) expresses an engine output power $Po\omega_{eng}$ when a torque $T_{tr}$ acts between the electric power transmitting stator 266 and the electric power transmitting rotor 278. The following formula (17) expresses a transmission power $Po\omega_{coup}$ that can be obtained by an electromagnetic coupling between the input side rotor 228 and the output side rotor 218. The following formula (18) expresses a generation power $Po\omega_{ele}$ of the rotor winding 230.

$$Po\omega_{eng} = T_e \times \omega_e \quad (16)$$

$$Po\omega_{coup} = (1-s) \times (T_e - T_{tr}) \times \omega_e \quad (17)$$

$$Po\omega_{ele} = s \times T_e \times \omega_e + (1-s) \times T_{tr} \times \omega_e \quad (18)$$

Referring to the formulae (9) and (18), compared to the example configuration illustrated in FIGS. 15 and 16, the example configuration illustrated in FIG. 26 can decrease the transmission power $Po\omega_{coup}$ that can be obtained by the electromagnetic coupling and can increase the generation power $Po\omega_{ele}$ of the rotor winding 230 according to the torque $T_{tr}$ that acts between the electric power transmitting stator 266 and the electric power transmitting rotor 278. To rotate/drive the output side rotor 218 with the generation power $Po\omega_{ele}$ of the rotor winding 230, it is necessary to supply electric power of the rotor winding 230 to the stator winding 220 via the rectifier 93, the boosting converter 94, and the inverter 40 and it is also necessary to convert the electric power supplied to the stator winding 220 into the power of the output side rotor 218. When the electric power of the rotor winding 230 is supplied to the stator winding 220 via the rectifier 93, the boosting converter 94, and the inverter 40, and when the electric power supplied to the stator winding 220 is converted into the power of the output side rotor 218, loss of the power may occur. Therefore, to increase a transmission efficiency of the power transmission apparatus, it is preferable to increase the rate of the transmission power $Po\omega_{coup}$ that can be obtained by the electromagnetic coupling and reduce the rate of the generation power $Po\omega_{ele}$ of the rotor winding 230. Therefore, compared to the example configuration illustrated in FIG. 26, the example configuration illustrated in FIGS. 15 and 16 can increase the transmission efficiency of the power transmission apparatus.

In the example configuration illustrated in FIG. 26, the rotor winding 230 and the electric power transmitting rotor winding 280 can be connected to have the same phases, so that the rotary magnetic fields of the rotor winding 230 and the electric power transmitting rotor winding 280, which may be generated when AC current flows through the rotor winding 230 and the electric power transmitting rotor winding 280, have the same rotational direction. In this case, if the number of poles P2 of the electric power transmitting rotor 278 is set to be equal to or greater than the number of poles P1 of the input side rotor 228 (P2≥P1), the torque acting between the electric power transmitting stator 266 and the electric power transmitting rotor 278 and the torque acting between the input side rotor 228 and the output side rotor 218 have the same direction.

Figure 27:
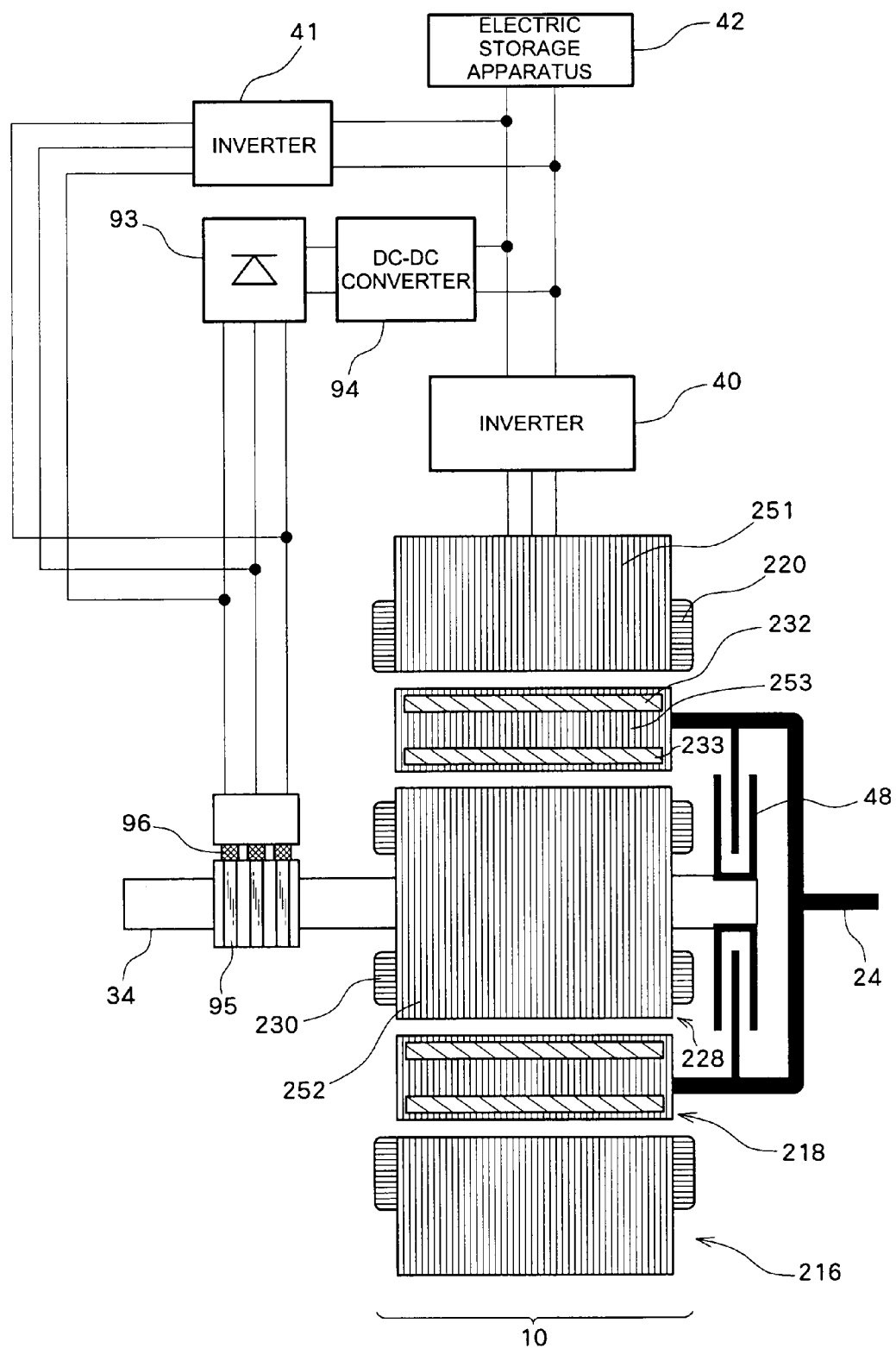
FIG. 27 illustrates another schematic configuration of the power transmission apparatus according to the second embodiment of the present invention.

An example configuration illustrated in FIG. 27 is different from the example configuration illustrated in FIGS. 15 and 16 in that a starter inverter 41 is additionally provided. The starter inverter 41 can convert the DC power of the electric storage apparatus 42 into AC (e.g., three-phase AC) power and can supply the AC power to each phase of the rotor winding 230 via the brush 96 and the slip ring 95. In the example configuration illustrated in FIG. 27, to start up the engine 36, the starter inverter 41 can be controlled to perform a switching operation so as to supply electric power of the electric storage apparatus 42 to the rotor winding 230 via the slip ring 95. The engine 36 can perform a cranking operation with electric power supplied to the rotor winding 230. In this case, the input side rotor 228 forms a rotary magnetic field. An electromagnetic interaction between the rotary magnetic field and field fluxes of the permanent magnets 233 of the output side rotor 218 generates a torque that acts on the input side rotor 228 connected to the engine 36. Meanwhile, the output side rotor 218 receives its reaction torque. Therefore, in a case where the engine 36 is started up during the EV traveling operation, it is preferable to control the switching operation of the inverter 40 so as to supply electric power of the electric storage apparatus 42 to the stator winding 220 in such a way as to generate a torque acting on the output side rotor 218 that can cancel the above-described reaction torque. With this control, the electric power supplied to the stator winding 220 can be used to rotate/drive the output side rotor 218.

In the above-described description, the boosting converter 94 is provided as a DC-DC converter capable of performing voltage conversion for the electric power rectified by the rectifier 93 and outputting a converted voltage. However, in the present embodiment, a step-down converter or a boost/step-down converter may be used as a DC-DC converter.

In the present embodiment, the input shaft 34 and the output shaft 24 of the electric rotary machine 10 can be switched. More specifically, the second rotor 218 can be mechanically connected to the engine 36 and the first rotor 228 can be mechanically connected to the wheels 38 via the transmission 44. In this case, the power of the engine 36 can be transmitted to the second rotor 218. The power of the first rotor 228 can be transmitted to the wheels 38 via the transmission 44 while changing speed. The second rotor 218 serves as an input side rotor, and the first rotor 228 serves as an output side rotor. In this case, when the power of the engine 36 is used to rotate/drive the wheels 38, the gear ratio of the transmission 44 can be changed so as to maintain the state where the rotational speed of the input side rotor (the second rotor 218) is higher than the rotational speed of the output side rotor (the first rotor 228). Therefore, it is possible to prevent the braking torque from acting on the output side rotor (the wheels 38) without supplying electric power from the electric storage apparatus 42 to the rotor winding 230 via the slip ring 95 (or the electric power transmitting stator winding 270).

Although some embodiments of the present invention have been described, it is needless to say that the present invention is not limited to the above-described embodiments and can be modified in various ways within the gist of the present invention.

The invention claimed is:

1. A power transmission apparatus comprising:
   a first rotary element having a rotary element conductor that can generate a rotary magnetic field;
   a stationary element having a stationary element conductor that can generate a rotary magnetic field;
   a second rotary element that can rotate relative to the first rotary element; and
   an engaging apparatus that can mechanically engage one of the first rotary element and the second rotary element with the other of the first rotary element and the second rotary element,
   wherein a torque acts between the first rotary element and the second rotary element according to the rotary magnetic field generated by the rotary element conductor, and a torque acts between the stationary element and the second rotary element according to the rotary magnetic field generated by the stationary element conductor,
   wherein the rotary element conductor can generate the rotary magnetic field when induced current flows according to a rotational difference generated between the first rotary element and the second rotary element,
   wherein power of a prime mover is transmitted to one of the first rotary element and the second rotary element and power of the other of the first rotary element and the second rotary element is transmitted to a load,
   wherein the power transmission apparatus further comprises:
      a transmission configured to transmit power from the other of the first rotary element and the second rotary element to the load while changing speed,
      an electric power transmission unit configured to take out AC power from the rotary element conductor, and
      an electric power conversion unit configured to convert the AC power taken out by the electric power transmission unit and supply converted electric power to the stationary element conductor, and
   wherein when the power of the prime mover is used to drive the load, a gear ratio of the transmission is changed to a smaller side so that a rotational speed of one of the first rotary element and the second rotary element, to which the power is transmitted from the prime mover, is maintained to be higher than a rotational speed of the other rotary element that transmits the power to the load as a rotational speed of the load becomes higher.

2. The power transmission apparatus according to claim 1, wherein the electric power conversion unit includes
   a rectifier configured to rectify the AC power taken out by the electric power transmission unit, and
   a DC-DC converter configured to convert a voltage of the electric power rectified by the rectifier into a voltage to be output,
   wherein the electric power which voltage is converted by the DC-DC converter is converted by an inverter into an AC electric power to be supplied to the stationary element conductor.

3. The power transmission apparatus according to claim 1, wherein the electric power transmission unit includes
   an electric power transmitting rotary element coupled with the first rotary element, wherein the electric power transmitting rotary element is connected to the rotary element conductor of the first rotary element and having an electric power transmitting rotary element conductor that can generate a rotary magnetic field, and
   an electric power transmitting stationary element having an electric power transmitting stationary element conductor through which induced current flows according to the rotary magnetic field generated by the electric power transmitting rotary element conductor,
   wherein the electric power conversion unit is configured to convert AC power generated by the electric power transmitting stationary element conductor.

4. The power transmission apparatus according to claim 3, wherein phases of the first rotary element conductor are opposite to that of phases of the electric power transmitting rotary element conductor.

5. The power transmission apparatus according to claim 1, wherein the electric power transmission unit includes
   a brush connected to the electric power conversion unit, and
   a slip ring connected to the rotary element conductor of the first rotary element and rotating together with the first rotary element while causing slip relative to the brush.

6. A power transmission apparatus comprising:
   a first rotary element having a rotary element conductor that can generate a rotary magnetic field;
   a stationary element having a stationary element conductor that can generate a rotary magnetic field;
   a second rotary element that can rotate relative to the first rotary element, wherein a torque acts between the first rotary element and the second rotary element according to the rotary magnetic field generated by the rotary element conductor, and a torque acts between the stationary element and the second rotary element according to the rotary magnetic field generated by the stationary element conductor; and an engaging apparatus that can mechanically engage one of the first rotary element and the second rotary element with the other of the first rotary element and the second rotary element, wherein the rotary element conductor can generate the rotary magnetic field when induced current flows according to a rotational difference generated between the first rotary element and the second rotary element, wherein power of a prime mover is transmitted to one of the first rotary element and the second rotary element and power of the other of the first rotary element and the second rotary element is transmitted to a load, wherein the power transmission apparatus further comprises:

a transmission configured to transmit the power from the other of the first rotary element and the second rotary element to the load while changing speed, an electric power transmission unit configured to take out AC power from the rotary element conductor, and an electric power conversion unit configured to convert the AC power taken out by the electric power transmission unit and supply converted electric power to the stationary element conductor, wherein the electric power conversion unit includes a rectifier configured to rectify the AC power taken out by the electric power transmission unit, and a DC-DC converter configured to convert a voltage of the electric power rectified by the rectifier into a voltage to be output, wherein the electric power which voltage is converted by the DC-DC converter is converted by an inverter into an AC electric power to be supplied to the stationary element conductor, and wherein a voltage conversion ratio of the DC-DC converter is decreased if a rotational speed of one of the first rotary element and the second rotary element is higher than a rotational speed of the other.

7. A power transmission apparatus comprising:

a first rotary element having a rotary element conductor that can generate a rotary magnetic field;

a stationary element having a stationary element conductor that can generate a rotary magnetic field;

a second rotary element that can rotate relative to the first rotary element, wherein a torque acts between the first rotary element and the second rotary element according to the rotary magnetic field generated by the rotary element conductor, and a torque acts between the stationary element and the second rotary element according to the rotary magnetic field generated by the stationary element conductor; and an engaging apparatus that can mechanically engage one of the first rotary element and the second rotary element with the other of the first rotary element and the second rotary element, wherein the rotary element conductor can generate the rotary magnetic field when induced current flows according to a rotational difference generated between the first rotary element and the second rotary element, wherein power of a prime mover is transmitted to one of the first rotary element and the second rotary element and power of the other of the first rotary element and the second rotary element is transmitted to a load, wherein the power transmission apparatus further comprises:

a transmission configured to transmit the power from the other of the first rotary element and the second rotary element to the load while changing speed, an electric power transmission unit configured to take out AC power from the rotary element conductor, and an electric power conversion unit configured to convert the AC power taken out by the electric power transmission unit and supply converted electric power to the stationary element conductor, wherein the electric power conversion unit includes a rectifier configured to rectify the AC power taken out by the electric power transmission unit, and a DC-DC converter configured to convert a voltage of the electric power rectified by the rectifier into a voltage to be output, wherein the electric power which voltage is converted by the DC-DC converter is converted by an inverter into an AC electric power to be supplied to the stationary element conductor, and wherein when the power of the prime mover is used to drive the load, a voltage conversion ratio of the DC/DC converter is reduced to reduce the torque acting between the first rotary element and the second rotary element on the condition that an output voltage of the DC-DC converter is higher than a voltage of an electric storage apparatus.

* * * * *